(12) United States Patent
Rothkopf

(10) Patent No.: US 7,894,177 B2
(45) Date of Patent: Feb. 22, 2011

(54) LIGHT ACTIVATED HOLD SWITCH

(75) Inventor: Fletcher R. Rothkopf, Chicago, IL (US)

(73) Assignee: Apple Inc., Cupertino, CA (US)

( * ) Notice: Subject to any disclaimer, the term of this patent is extended or adjusted under 35 U.S.C. 154(b) by 1455 days.

(21) Appl. No.: 11/323,378

(22) Filed: Dec. 29, 2005

(65) Prior Publication Data

US 2007/0156364 A1 Jul. 5, 2007

(51) Int. Cl.
*H01H 47/00* (2006.01)

(52) U.S. Cl. ..................................... 361/173

(58) Field of Classification Search ............... 361/173
See application file for complete search history.

(56) References Cited

U.S. PATENT DOCUMENTS

| | | |
|---|---|---|
| 4,090,216 A | 5/1978 | Constable |
| 4,386,345 A | 5/1983 | Narveson et al. |
| 4,451,849 A | 5/1984 | Fuhrer |
| 4,589,022 A | 5/1986 | Prince et al. |
| 4,674,743 A | 6/1987 | Hirano |
| 4,692,915 A | 9/1987 | Moriya et al. |
| 4,776,323 A | 10/1988 | Spector |
| 4,849,963 A | 7/1989 | Gallegos |
| 4,939,611 A | 7/1990 | Connolly |
| 5,001,462 A | 3/1991 | Seemann et al. |
| 5,137,501 A | 8/1992 | Mertesdorf |
| 5,267,942 A | 12/1993 | Saperston |
| 5,313,187 A | 5/1994 | Choi et al. |
| 5,313,188 A | 5/1994 | Choi et al. |
| 5,343,871 A | 9/1994 | Bittman et al. |
| 5,456,032 A | 10/1995 | Matsumoto et al. |

(Continued)

FOREIGN PATENT DOCUMENTS

JP 10-188452 7/1998

(Continued)

OTHER PUBLICATIONS

"12.1" 925 Candela Mobile PC, www.lcdhardware.com/panel/12_1_panel/default.asp, downloaded Dec. 19, 2002.

(Continued)

*Primary Examiner*—Stephen W Jackson
(74) *Attorney, Agent, or Firm*—Beyer Law Group LLP

(57) ABSTRACT

An automatic hold switch is disclosed. The automatic hold switch provides a means for automatically switching a hold feature on and off. When the hold feature is on, one or more input devices of a portable electronic device are disabled or prevented from providing input signals. When the hold feature is off, one or more input devices of a portable electronic device are enabled or allowed to provide input signals. Because the user no longer has to manually control the hold feature, the number of actions that need to be taken by the user is reduced. In one example, the automatic hold switch is embodied with light sensors that detect when the device is in a dark environment and when the device is in a light environment. A dark environment indicates to the portable electronic device that the user wishes not to input and therefore the hold feature is turned on. A lighted environment indicates to the portable electronic device that the user wishes to input and therefore the hold feature is turned off.

22 Claims, 9 Drawing Sheets

FIG. 3

U.S. PATENT DOCUMENTS

| | | | |
|---|---|---|---|
| 5,465,729 | A | 11/1995 | Bittman et al. |
| 5,533,947 | A | 7/1996 | Tomlinson et al. |
| 5,592,143 | A | 1/1997 | Romney et al. |
| 5,662,117 | A | 9/1997 | Bittman |
| 5,670,985 | A | 9/1997 | Cappels, Sr. et al. |
| 5,690,411 | A | 11/1997 | Jackman |
| 5,726,672 | A | 3/1998 | Hernandez et al. |
| 5,779,348 | A | 7/1998 | Interlicchio |
| 5,836,673 | A | 11/1998 | Lo |
| 5,879,076 | A | 3/1999 | Cross |
| 5,952,925 | A * | 9/1999 | Secker .................. 340/573.2 |
| 5,982,573 | A | 11/1999 | Henze |
| 5,986,200 | A | 11/1999 | Curtin |
| 6,001,048 | A | 12/1999 | Taylor |
| 6,064,372 | A | 5/2000 | Kahkoska |
| 6,125,697 | A * | 10/2000 | Holton et al. ................ 73/309 |
| 6,146,006 | A | 11/2000 | Cross |
| 6,217,183 | B1 | 4/2001 | Shipman |
| 6,230,047 | B1 | 5/2001 | McHugh |
| 6,379,013 | B1 | 4/2002 | Bechtel et al. |
| 6,467,924 | B2 | 10/2002 | Shipman |
| 6,519,206 | B1 * | 2/2003 | Martin et al. ............... 367/139 |
| 6,532,152 | B1 | 3/2003 | White et al. |
| 6,538,567 | B2 | 3/2003 | Stewart |
| 6,544,200 | B1 | 4/2003 | Smith et al. |
| 6,549,179 | B2 | 4/2003 | Youngquist et al. |
| 6,582,342 | B2 | 6/2003 | Kaufman |
| 6,672,991 | B2 | 1/2004 | O'Malley |
| 6,717,376 | B2 | 4/2004 | Lys et al. |
| 6,746,247 | B2 | 6/2004 | Barton |
| 6,768,066 | B2 | 7/2004 | Wehrenberg |
| 6,897,624 | B2 | 5/2005 | Lys et al. |
| 6,918,677 | B2 | 7/2005 | Shipman |
| 6,956,564 | B1 | 10/2005 | Williams |
| 6,977,335 | B2 | 12/2005 | Georges et al. |
| 7,038,118 | B1 | 5/2006 | Gimarc |
| 7,060,008 | B2 | 6/2006 | Watterson et al. |
| 7,078,607 | B2 | 7/2006 | Alferness |
| 7,135,637 | B2 | 11/2006 | Nishitani et al. |
| 7,156,773 | B2 | 1/2007 | Takai et al. |
| 7,164,076 | B2 | 1/2007 | McHale et al. |
| 7,177,672 | B2 | 2/2007 | Nissila |
| 7,179,984 | B2 | 2/2007 | Nishitani et al. |
| 7,183,480 | B2 | 2/2007 | Nishitani et al. |
| 7,207,935 | B1 | 4/2007 | Lipo |
| 7,224,282 | B2 | 5/2007 | Terauchi et al. |
| 2001/0026413 | A1 | 10/2001 | Kisaka et al. |
| 2003/0159566 | A1 | 8/2003 | Sater et al. |
| 2004/0012556 | A1 | 1/2004 | Yong et al. |
| 2004/0044291 | A1 | 3/2004 | Yasushi et al. |
| 2004/0077934 | A1 | 4/2004 | Massad |
| 2004/0127335 | A1 | 7/2004 | Watterson et al. |
| 2004/0252397 | A1 | 12/2004 | Hodge et al. |
| 2005/0126370 | A1 | 6/2005 | Takai et al. |
| 2005/0215846 | A1 | 9/2005 | Elliot |
| 2005/0288159 | A1 | 12/2005 | Tackett |
| 2006/0088228 | A1 | 4/2006 | Marriott et al. |
| 2006/0102171 | A1 | 5/2006 | Gavish |
| 2006/0107822 | A1 | 5/2006 | Bowen |
| 2006/0111621 | A1 | 5/2006 | Coppi et al. |
| 2006/0112808 | A1 | 6/2006 | Kiiskienen et al. |
| 2006/0169125 | A1 | 8/2006 | Ashkenazi et al. |
| 2006/0185502 | A1 | 8/2006 | Nishitani et al. |
| 2006/0234832 | A1 | 10/2006 | Toyama et al. |
| 2006/0243120 | A1 | 11/2006 | Takai et al. |
| 2006/0272480 | A1 | 12/2006 | Gimarc |
| 2006/0277474 | A1 | 12/2006 | Robarts et al. |
| 2006/0288846 | A1 | 12/2006 | Logan |
| 2007/0027000 | A1 | 2/2007 | Shirai et al. |
| 2007/0033295 | A1 | 2/2007 | Marriott |
| 2007/0044641 | A1 | 3/2007 | McKinney et al. |
| 2007/0060446 | A1 | 3/2007 | Asukai et al. |
| 2007/0074617 | A1 | 4/2007 | Vergo |
| 2007/0074619 | A1 | 4/2007 | Yorktown |
| 2007/0079691 | A1 | 4/2007 | Turner |
| 2007/0113725 | A1 | 5/2007 | Oliver et al. |

FOREIGN PATENT DOCUMENTS

| | | |
|---|---|---|
| JP | 2001299980 | 10/2001 |
| JP | 2001-307413 | 11/2001 |
| JP | 2001306071 | 11/2001 |
| JP | 2002073018 | 3/2002 |
| JP | 2002-298496 | 10/2002 |
| JP | 2003177749 | 6/2003 |
| JP | 2003177750 | 6/2003 |
| JP | 2004113552 | 4/2004 |

OTHER PUBLICATIONS

"Active MP3 DJ Studio," downloaded Oct. 28, 2004, http://www.multimediasoft.com/amp3dj/.

"Advanced Safety Equipment; Led Armband", www.advancedsafetyequipment.com/armband.html, downloaded Jul. 12, 2004.

"ADXL311—Low Cost, Ultra Compact, ±2 g, Dual Axis Accelerometer," downloaded Nov. 22, 2004, http://www.analog.com/en/prod/0,,764_800_ADXL311,00.html.

"BL82 Series Backlit Keyboards", www.tg3electronics.com/products/backlit/backlit.htm, downloaded Dec. 19, 2002.

"DJ Software PRO—Mix Vibes PRO 4," downloaded Oct. 28, 2004, http://www.mixvibes.com/pages/mixvibespro4.html.

"Honor for StepMan in the design competition the mVs 2004," downloaded Oct. 20, 2004, http://216.239.37.104/translate_c?hl=en&sl=de&u=http://www.innovations-report.de/htm . . . .

"How Music Affects Your Workout," downloaded Oct. 28, 2004, http://www.tinajuanfitness.info/articles/art082897.html.

"Industrial Keyboards & Pointing Devices", www.stealthcomputer.com/peripherals_oem.htm, downloaded Dec. 19, 2002.

"Introducing GarageBand.," downloaded Oct. 28, 2004, http://www.apple.com/ilife/garageband/.

"Lumitex Inc.; LCD Backlighting", www.lumitex.com/lcd_backlighting.html, downloaded Jul. 12, 2004.

"Mixing & DJ Software for the Mac," downloaded Oct. 28, 2004, http://www.mp3-mac.com/Pages/MixDJ.html.

"MP3Run 256 MB Digital Audio Player," http://www.nike-philips.com/product_details.jsp?lang=enj&product=MP3RUNpsa260, downloaded Oct. 28, 2004.

"Phase Vocoder," downloaded Oct. 20, 2004, http://www.mti.dmu.ac.uk/EARS/Data/node325.html.

"Poly-Optical UniGlo provides long life, low power, inert, maintenance free backlighting for all switch and control panel designs", www.poly-optical.com/membrane_switches.html, downloaded Dec. 19, 2002.

"Protexion Plus Reflective Safety Harness/vest", http://protexion.alain-pelletier.com, downloaded Jul. 12, 2004.

"Rocky Matrix Backlit Keyboard", www.amrel.com/asi_matrixkeyboard.html, downloaded Dec. 19, 2002.

"Smooth 9.25HR Programs Designed for your Fitness Goals," downloaded Oct. 28, 2004, http://www.treadmillbynet.com/smooth925_programs.htm.

"Sony 20GB Network Walkman® Hard I Player," downloaded Oct. 14, 2004, http://www.sears.com/sr/javasr/product.do?BV_SessionID=@@@@0015464848.109777 . . . .

"Sony Walkman Celebrates 25th Anniversary Milestone With The Launch Of A Hard Drive Music Player," Sep. 29, 2004, Press Release, downloaded on Oct. 14, 2004, http://www.pcworld.idg.com.au/index.php/id;745457704.

"Table of Contents," Oct. 2001, No. 10, Sensors & Transducers e-Digest (S&T), downloaded Oct. 14, 2004, http://www.sensorsportal.com/HTML/DIGEST/Digest_Oct_2001.htm.

"TAOS, Inc., Announces Industry's First Ambient Light Sensor to Convert Light Intensity to Digital Signals", www.taosinc.com/pressrelease_090902.htm, downloaded Jan. 23, 2003.

"The Mixer," downloaded Oct. 28, 2004, http://www.dj.deft.ukgateway.net/mainpages/mixers.htm.

"The new iTunes.," downloaded Oct. 28, 2004, http://www.apple.com/ilife/itunes/.

The PaceMaker Plug-in v2.02, Oct. 11, 2004, downloaded Oct. 20, 2004, http://sky.prohosting.com/oparviai/pacemaker/.

"Toughbook 28, Powerful, Rugged and Wireless", www.panasonic.com/computer/notebook/html/01a_s8.htm, downloaded Dec. 19, 2002.

"Tracer 2000 Computer", www.pst911.com/tracer.html, downloaded Dec. 19, 2002.

"Traktor DJ Studio 2 Ready for iTunes and iPod," downloaded Nov. 22, 2004, http://www.native-instruments.com/index.php?id=2270&type=1.

"Traktor DJ Studio 2.0 with OS X Support Shipping," Press Release dated Nov. 15, 2002, http://new.harmony-central.com/Newp/2002/Traktor-DJ-Studio-20,html.

"Traktor is the best Mp3 DJ Software," downloaded May 25, 2005, http://www.dj-tips-and-tricks.com/mp3-dj-software.html.

"Treadmill Programs," downloaded Oct. 28, 2004, http://us.home.lifefitness.com/content.cfm/treadmillprograms.

"VIP Global Marketing; Safety Lights", www.vipglobal.com/safety-lights.htm, downloaded Jul. 12, 2004.

"Virtual DJ Studio—MP3 Mixer," downloaded Oct. 28, 2004, http://www.vdj3.com/.

"What is music?," downloaded Oct. 28, 2004, http://www.mfiles.co.uk/other-what-is-music.htm.

"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.

"Why Buy: ThinkPad", www.pc.ibm.com/us/thinkpad/easeofuse.html, downloaded Dec. 19, 2002.

Bociurkiw, Michael, "Product Guide: Vanessa Matz,", www.forbes.com/asap/2000/1127/vmartz_print.html, Nov. 27, 2000.

Eluminx Home web page, www.eluminx.com, downloaded Dec. 19, 2002.

HDK Acceleration Sensor, Hokuriku ACS010B specification, pp. 1-2.

Mathias Mainka, "StepMan—matching music to your moves," Jan. 2004, CG Topics.

MK2001MPL (HDD1212) Hard Disk Drive, Product Specification, Toshiba Storage Device Division, Toshiba Corporation, Sep. 2000.

N J Bailey, "Spectral manipulation with the Phase Vocoder," Oct. 13, 1998, downloaded Oct. 20, 2004, http://sculptor.sourceforge.net/Sculptor/lj/node2.html.

Nick Bailey, "Issue 54: Sculptor: A Real Time Phase Vocoder," Oct. 1, 1998, Linux Journal.

Steve, "OKI Claims Smallest 3-Axis Accelerometer," Aug. 25, 2004, downloaded Oct. 14, 2004, http://robots.net/article/1269.html.

Szabo et al., "The Effects of Slow—and Fast-Rhythm Classical Music on Progressive Cycling to Voluntary Physical Exhaustion", Sep. 1999, The Journal of Sports Medicine and Physical Fitness, pp. 220-225.

Toshiba MK2003GAH (HDD1364) Hard Disk Drive Specifications, Toshiba America Inc., 2003, pp. 1-3.

Toshiba MK6017MAP 6.0 GB IDE 2.5 9.5MM Notebook Hard Drive Specification, pp. 1-4, downloaded Apr. 29, 2003: http://shop.store.yahoo.com/netcomdirect/tosmk6017map.html.

Toshiba Shock Sensor Roadmap PPT Slide, Toshiba America Inc., p. 1, downloaded Apr. 29, 2003: http://www.toshiba.com/taec/components/Generic/PT_ShocksensorRoadMap.htm.

U.S. Appl. No. 10/791,495, filed Mar. 1, 2004.

* cited by examiner

| | INPUT DEVICE | | 130 |
|---|---|---|---|
| | ON | OFF | |
| AUTO ENABLE CONDITION 1 (LIGHT) | DISABLE | ENABLE | |
| AUTO ENABLE CONDITION 2 (DARK) | ENABLE | ENABLE | |
| AUTO DISABLE | DISABLE | ENABLE | |

| | INPUT DEVICE | | | 140 |
|---|---|---|---|---|
| | ON | AUTO | OFF | |
| SENSOR CONDITION 1 (LIGHT) | DISABLE | ENABLE | ENABLE | |
| SENSOR CONDITION 2 (DARK) | DISABLE | DISABLE | ENABLE | |

LIGHT ACTIVATED HOLD SWITCH

CROSS REFERENCE TO RELATED APPLICATIONS

This application is related to the following applications, all of which are herein incorporated by reference:

U.S. patent application Ser. No. 10/402,311, titled "COMPUTER LIGHT ADJUSTMENT", filed Mar. 26, 2003;

U.S. patent application Ser. No. 10/889,933, titled "HANDHELD DEVICES AS VISUAL INDICATORS", filed Jul. 12, 2004; and U.S. patent application Ser. No. 10/997,479, titled "MUSIC SYNCHRONIZATION ARRANGEMENT", filed Nov. 24, 2004.

BACKGROUND OF THE INVENTION

1. Field of the Invention

The present invention relates generally to portable electronic devices. More particularly, the present invention relates to a portable electronic devices that use a hold switch.

2. Description of the Related Art

Most handheld devices include a manual hold switch for locking the input devices of a portable electronic device. The hold switch typically includes two positions: ON and OFF. When the switch is in the OFF position, the user is allowed to make entries using the input devices. When the switch is in the ON position, the input devices are locked and therefore the user is prevented from making entries. This feature can be used to prevent accidental entries when the device is stowed.

Unfortunately, in some portable electronic devices especially those that are continuously being stowed and used, the hold switch can be a nuisance as it can almost double the number of actions a user must make to make an entry. For example, in the case of a handheld music player, in order to select a song when the device is in their pocket, a user removes the device from their pocket, turns OFF the hold switch, then makes a selection using the input device (e.g., scroll through list using scroll device, and select a song using a button). Once a song has been selected, the user then turns ON the hold switch, and places the device back in their pocket. The user performs at least three actions, two of which are associated with locking and unlocking the input devices.

In lieu of the above, a new hold feature is desired especially one that reduces the number of actions that need to be taken by a user.

SUMMARY OF THE INVENTION

The invention relates, in one embodiment, to a portable electronic device. The portable electronic device includes a control mechanism that provides an input mode and a hold mode for the portable electronic device. The portable electronic device also includes one or more input devices for inputting into the portable electronic device. The portable electronic device further includes one or more sensors that provide cues for initiating an automatic hold feature. The automatic hold feature includes switching between the input and hold modes based on the sensor output. The input devices are enabled when the portable electronic device is in the input mode. The input devices are disabled when the device is in the hold mode.

The invention relates, in another embodiment, to a method of operating a portable electronic device. The method includes monitoring environmental conditions. The method also includes determining whether a triggering event should be initiated based on the environmental conditions. The method additionally includes changing the portable electronic device from a first mode to a second mode when the triggering event is initiated.

The invention relates, in another embodiment, to a method performed on a hand-held media player. The method includes determining if an auto hold feature is activated. The method also includes measuring ambient light surrounding the handheld media player. The method further includes enabling one or more input devices of the hand-held media player when the ambient light level is high and the auto hold feature is activated. The method additionally includes disabling the one or more input device of the hand-held media player when the ambient light level is low and the auto hold feature is activated.

The invention relates, in another embodiment, to a portable hand held device. The portable hand held device includes input devices for making inputs into the portable handheld device. The portable hand held device also includes output devices for outputting information from the portable handheld device. The portable hand held device further includes a plurality of sensors that provides information or cues that help predict the future use of the portable hand held device or anticipate the user's needs associated with the portable handheld device so that the portable hand held device can be configured accordingly, each of the sensors being configured to measure different environmental conditions at the portable handheld device. The portable hand held device additionally includes a control system operatively coupled to the input devices, output devices and sensors. The control system includes a situational awareness module that obtains sensor data from the sensors and extracts control information from the sensor data. The situational awareness module includes a mechanism that maps various functions to sensor events pulled from the sensor data. The functions are when the sensor event or events associated therewith are performed.

The invention relates, in another embodiment, to a method of operating a portable handheld electronic device. The method includes assigning a function to one or more sensor/sensor events. The method also includes obtaining sensor data from one or more sensors. The method further includes identifying particular sensor events from the sensor data. The method additionally includes implementing the functions assigned to sensor/sensor events when the sensor events are identified.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1:
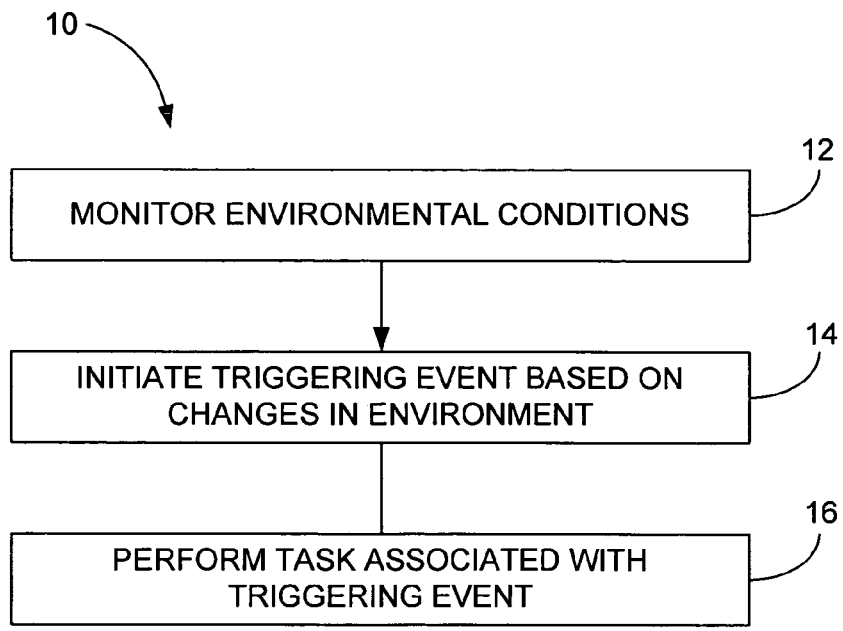
FIG. 1 is a method of operating a portable electronic device, in accordance with one embodiment of the present invention.

The present invention relates to an intuitive portable electronic device that anticipates or predicts a user's desires on how they would like use the portable electronic device. The portable electronic device is therefore ready to perform a user function when the user desires to perform the function. The user does not have to perform additional steps such as selecting menu options in a GUI or activating a button or switch. For example, the portable electronic device may change its state or mode or adjust a control feature based on the user's anticipated needs, but without receiving instructions from the user (thereby reducing steps and making the device more user friendly).

This may be accomplished with one or more sensors that are located on the portable electronic device and that are designed to sense things that lead to intelligent decisions by the portable electronic device. In essence, the sensors provide information or cues that help predict the portable electronic devices future use or user's needs so that the device can be configured accordingly. In most cases, the sensors are configured to sense one or more environmental attributes surrounding the portable electronic device. The environmental attributes may for example include temperature, ambient light, motion, vibration, pressure, touch, pressure, noise, orientation, time and/or the like.

One particular aspect of the invention pertains to anticipating or making a determination whether a user wants to perform inputting. If its believed that the user would like to perform inputting, the input devices of the portable electronic device are automatically unlocked and enabled for inputting. That is, the hold feature is automatically turned OFF without user manually actuating a switch each and every time. If it is believed that the user would not like to performing inputting, the input devices of the portable electronic device are automatically locked and disabled from inputting. That is, the hold feature is automatically turned ON without the user manually actuating a switch each and every time. The determination of whether to turn the hold feature ON and OFF is typically based on signals generated from one or more sensors disposed on the portable electronic device.

In one embodiment, the sensors are ambient light sensors that sense when the device is in a dark environment or when the device is in a light environment. If the portable electronic device is in a dark environment such as for example in a pocket or backpack or bag or case or purse, the input devices of the portable electronic device are disabled (hold feature ON). If the portable electronic device is in a light environment, the input devices of the portable electronic device are enabled (hold feature OFF). This embodiment works on the basic assumption that when the portable electronic device is in a dark environment it is packed away inside a pocket, case, purse or bag, where inputting is not desired to be performed and where accidental activation of input devices is likely, and when the portable electronic device is in a light environment, the device is being used by the user where inputting is desired to be performed (e.g., the device is taken out of the pocket so that the user can perform an operation such as selecting a song).

The invention is particularly suitable in hand-held electronic devices. As used herein, the term "hand-held" means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. Cellular phones, and media players such as music players are examples of hand-held devices that can be operated solely with one hand. In the case of a cell phone, for example, a user may grasp the phone in one hand between the fingers and the palm and use the thumb to make entries using keys, buttons or a joy pad. In two-handed operation, one hand is used to support the device while the other hand performs operations with a user interface during use or alternatively both hands support the device as well as perform operations during use. PDA's and media players such as game and video players are examples of hand-held device that are typically operated with two hands. In the case of the PDA, for example, the user may grasp the device with one hand and make entries using the other hand, as for example using a stylus. In the case of the game player, the user typically grasps the device in both hands and make entries using either or both hands while holding the device.

The footprint of the hand-held device may be widely varied. The footprint is typically associated with how the device is going to be used. Palm sized devices such as PDAs are typically used with both hands and thus they tend to be larger while hand sized devices such as cell phone handsets are typically used with only one hand and thus they tend to be smaller. Although there are different footprints, there are typically minimum and maximum footprints. If the footprint is too large or too small, the device may be difficult to use as a hand held device.

In one embodiment, the hand-held device is sized for placement into a pocket of the user. By being pocket-sized, the user does not have to directly carry the device and therefore the device can be taken almost anywhere the user travels (e.g., the user is not limited by carrying a large, bulky and often heavy device, as in a laptop or notebook computer). In cases such as these, the sensors provide information about the ambient environment surrounding the user as well as information about the environment inside the pocket (or bag, purse, case, etc). The differences in these conditions may be used to make intelligent decisions about the intended use of the device, which can be used to reconfigure the device (e.g., hold mode for inside the pocket, input mode for outside the pocket).

Embodiments of the invention are discussed below with reference to FIGS. 1-15. However, those skilled in the art will readily appreciate that the detailed description given herein with respect to these figures is for explanatory purposes as the invention extends beyond these limited embodiments.

FIG. 1 is a method 10 of operating a portable electronic device, in accordance with one embodiment of the present invention. The portable electronic device may be a handheld device and further a pocket sized handheld device. The method is designed to anticipate the needs of the user based on environment conditions so that the user does not have to initiate a task on their own (e.g., eliminates the user having to make additional selections). The method is typically accomplished without the user knowing, i.e., the method is part of the underlying operation of the portable electronic device.

The method 10 generally begins at block 12 where the portable electronic device monitors environment conditions. The environment conditions may be associated with the ambient environment surrounding the device and/or the user, the user and/or the device. The step of monitoring may include sensing one or more environmental attributes including but not limited to ambient light, temperature, noise, vibration, motion, touch, pressure, time, force, etc.

This may for example be accomplished with one or more sensors that measure the same, similar or different environmental attributes. In one embodiment, a single sensor is used. In another embodiment, multiple sensors measuring the same environmental attributes are used. In yet another embodiment, multiple sensors measuring different environmental attributes are used.

The method 10 also includes block 14 where a determination is made as to whether or not a triggering event should occur based on changes in the environment. This may for example be accomplished via a controller that analyzes one or more sensor outputs and makes a determination based on the sensor outputs. For example, analyzing the output of a sensor and initiating the trigger when the output is at a certain level or when it has changed a certain amount (e.g., absolute or relative). Or analyzing the output from multiple sensors and initiating a trigger when a each of the outputs is at a certain level or when they have changed a certain amount. As should be appreciated, different truth tables can be created for each sensor added.

The method 10 additionally includes block 16 where a task associated with the triggering event is performed. This may for example include reconfiguring the portable electronic device or changing a mode or state of the portable electronic device. For example, changing the portable electronic device from a first mode to a second mode when the triggering event takes place (or vice versa). This can also include adjusting a control feature such as Play/Pause, volume, etc.

In one embodiment, the step of monitoring includes monitoring the ambient light level, the step of determining if a trigger event should occur includes determining if the ambient light level has changed a certain amount or reached a predetermined or specified level, and the step of performing a task include automatically switching between an input mode where all or a select number of input devices are unlocked and a hold mode where all or a select number of input devices are locked based on the ambient light level. For example, switching from an input mode to a hold mode when the ambient light level decreases a certain amount or reaches a predetermined or specified darkness level, and switching from a hold mode to an input mode when the ambient light level increases a certain amount or reaches a predetermined or specified lightness level. This embodiment works particularly well for portable electronic devices such as music players that are continuously being used and stored (e.g., take out of pocket, select song, play song, put back into pocket).

In another embodiment, the step of monitoring includes monitoring the ambient light level, the step of determining if a trigger event should occur includes determining if the ambient light level has changed a certain amount or reached a predetermined or specified level, and the step of performing a task include automatically switching between a ring mode (where a cellular phone rings when a call is received) and a vibrate mode (where a cellular phone vibrates when a call is received) based on the ambient light level. For example, switching from a ring mode to a vibrate mode when the ambient light level decreases a certain amount or reaches a predetermined or specified darkness level, and switching from a vibrate mode to a ring mode when the ambient light level increases a certain amount or reaches a predetermined or specified lightness level. In this example, the cell phone is placed in vibrate mode when placed in a pocket and ring mode when the cell phone is held in the ambient environment as for example during use.

In another embodiment, the step of monitoring includes monitoring the force exerted on the surface of the portable device, the step of determining if a trigger event should occur includes determining if the force level has changed a certain amount or reached a predetermined or specified force level, and the step of performing a task include automatically switching between an input mode where all or a select number of input devices are unlocked and a hold mode where all or a select number of input devices are locked based on the force level. For example, if constant forces are being exerted as for example when a user grips the device, it can be assumed that the device is being held and therefore inputting is desired, and if forces are not being constantly exerted, it can be assumed that the device is not being held and therefore inputting is not desired.

In another embodiment, the step of monitoring includes monitoring the surface of the device for one or more touches, the step of determining if a trigger event should occur includes determining whether or not a touch has occurred, and the step of performing a task include automatically switching between an input mode where all or a select number of input devices are unlocked and a hold mode where all or a select number of input devices are locked based on touch/no touch. For example, if a touch is sensed for example when a user grips the device, it can be assumed that the device is being held and therefore inputting is desired, and if a touch is not sensed, it can be assumed that the device is not being held and therefore inputting is not desired.

In another embodiment, the step of monitoring includes monitoring the temperature at the surface of the device, the step of determining if a trigger event should occur includes determining if the temperature has changed a certain amount or reached a predetermined or specified level, and the step of performing a task include automatically switching between an input mode where all or a select number of input devices are unlocked and a hold mode where all or a select number of input devices are locked based on the temperature. For example, switching from an input mode to a hold mode when the temperature decreases a certain amount or reaches a predetermined or specified temperature, and switching from a hold mode to an input mode when the temperature increases a certain amount or reaches a predetermined or specified temperature. Generally, the surface temperature of the device will change when held in the hand.

In another embodiment, the step of monitoring includes monitoring the ambient light level, the step of determining if a trigger event should occur includes determining if the ambient light level has changed a certain amount or reached a predetermined or specified level, and the step of performing a task include automatically switching between a first music mode where a first playlist is initiated and a second music mode where a second playlist is initiated based on the ambient light level. For example, switching from a first music mode to a second music mode when the ambient light level decreases a certain amount or reaches a predetermined or specified darkness level, and switching from a second music mode to a first music mode when the ambient light level increases a certain amount or reaches a predetermined or specified lightness level.

In another embodiment, the step of monitoring includes monitoring the motion or vibration of the device, the step of determining if a trigger event should occur includes determining if the motion or vibration has changed a certain amount or reached a predetermined or specified level, and the step of performing a task include automatically switching between a play mode where a song is played and a pause mode where a song is paused based on the motion or vibration. For example, switching from a play mode to a pause mode when the vibration decreases a certain amount or reaches a predetermined or specified level, and switching from pause mode to play mode when the vibration increases a certain amount or reaches a predetermined or specified level. This embodiment is well suited for user that use music players while exercising (e.g., plays when exercising, stops when exercise stops).

In another embodiment, the step of monitoring includes monitoring the orientation of the device (e.g., accelerometer), the step of determining if a trigger event should occur includes determining if the device is in an orientation for use (e.g., right side up) or for non use (upside down, tilted, etc.), and the step of performing a task includes automatically switching between an input mode where all or a select number of input devices are unlocked and a hold mode where all or a select number of input devices are locked based on the ambient light level. For example, switching from an input mode to a hold mode when the orientation is incorrect, and switching from a hold mode to an input mode when the orientation is correct.

In another embodiment, the step of monitoring includes monitoring orientation and motion/vibration, the step of determining if a trigger event should occur is based on the orientation of the device and the recent history of the vibration/motion, and the step of performing a task includes automatically powering down (e.g., turning the entire device off) after an audible or other warning. This embodiment is meant to determine if the device has been abandoned while in PLAY mode. For example, if a user places a portable music player in PLAY mode onto a flat surface (orientation) and then does not move the device for a specified period of time (perhaps 15 minutes), it may be likely that the user is finished listening to the device and forgot to turn it off. The automatic power down should save the battery charge and reduce deep battery cycling.

In another embodiment, the step of monitoring includes monitoring ambient noise level, the step of determining if a trigger should occur includes determining if the noise level has changed a certain amount or reached a specified noise level, and the step of performing a task includes automatically switching ring modes or the ring volume setting. This embodiment may be useful for the user who normally prefers a low ring volume but does not want to miss a call because they walked into a noisy environment (like a train station).

In another embodiment, the step of monitoring includes monitoring ambient noise level, the step of determining if a trigger should occur includes determining if the noise level has changed a certain amount or reached a specified noise level, and the step of performing a task includes automatically switching the headphone volume based on the ambient noise. For example, when the noise around the user increases, the device automatically increases the output volume of the music to compensate. The listening experience is therefore not interrupted.

In another embodiment, the step of monitoring includes monitoring time, the step of determining if a trigger should occur includes determining if the time has changed a certain amount or reached a specified time and the step of performing a task includes adjusting the ring volume based on the time. For example, the ring volume may be lowered or made quieter after 9 PM (or some other user specified time). This embodiment may be enhanced by also monitoring orientation and/or motion. For example, if the phone is placed on a table or nightstand.

In another embodiment, the step of monitoring includes monitoring ambient light level, the step of determining if a trigger should occur includes determining if the ambient light level has changed a certain amount or reached a specified light level and the step of performing a task includes adjusting the backlight on the display or input keys of the device based on the ambient light level. See for example U.S. patent application Ser. No. 10/402,311, which is herein incorporated by reference.

Figure 2:
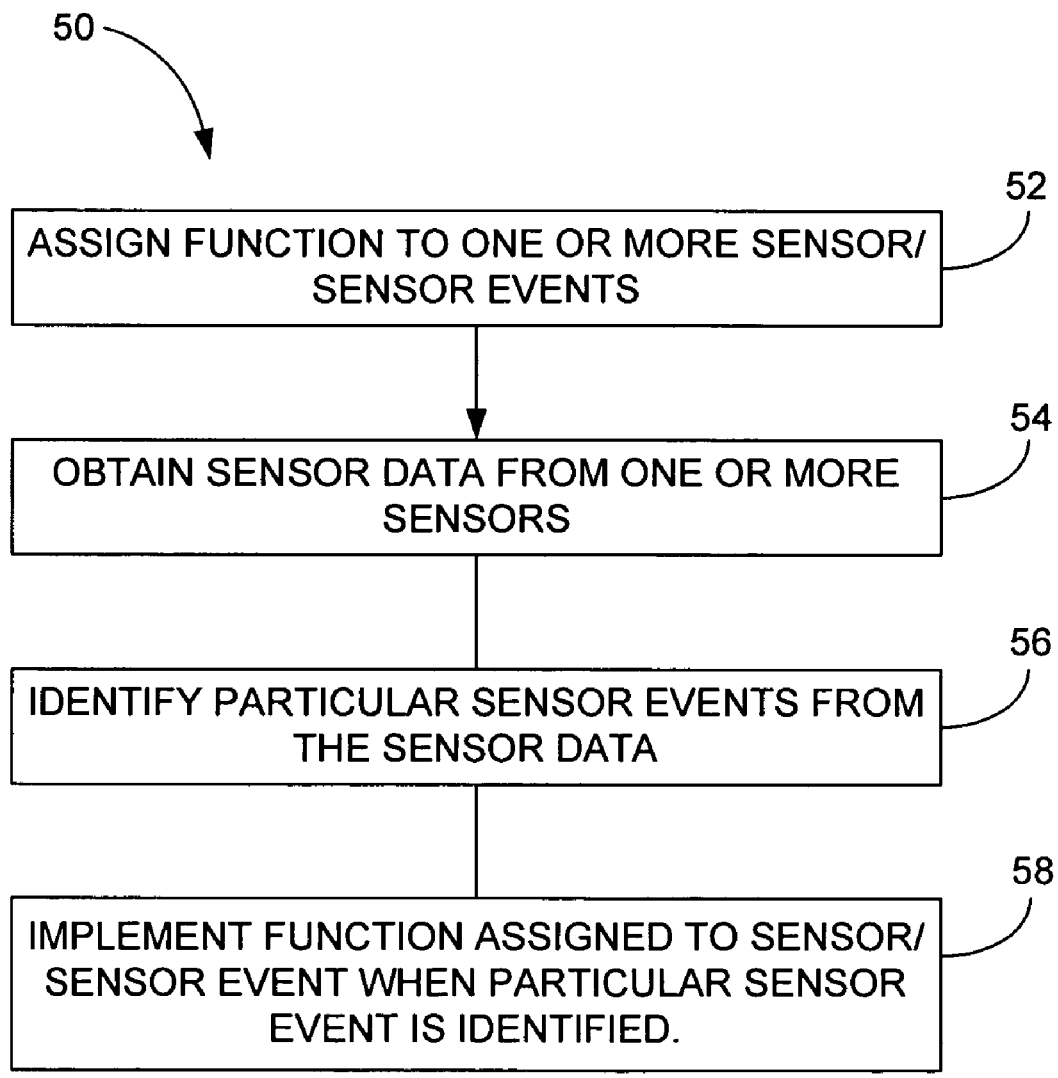
FIG. 2 is a method of operating a portable hand held device, in accordance with one embodiment of the present invention.

FIG. 2 is a method 50 of operating a portable hand held device, in accordance with one embodiment of the present invention. The method 50 generally begins at block 52 where functions or commands are assigned to one or more sensors and sensor events produced therefrom (particular functions are mapped to particular sensor events). A single function may be assigned to an individual sensor/sensor event or to a group of sensors/sensor events. Any combination can be used. The assignments may be part of a default setting or they may be programmable or learned. In the case of programmable, the user may utilize a control panel where they can enable/disable functions, reassign functions to different sensors, set different thresholds for sensor events, choose between predetermined configurations, etc. By way of example, the assignments may be stored as a table in the controller and/or memory depending on the needs of the system.

In block 54, sensor data is obtained from one or more sensors contained inside the portable hand held device. For example, the controller may be configured to read the outputs from the various sensors. The sensors can be widely varied and may include light sensors, noise sensors, motion sensors, vibration sensors, pressure sensors, touch sensors, orientation sensors, location sensors, force sensors, temperature sensors, clocks, etc. In some cases, the sensors are continuously sensing the environment. In other cases, the sensors perform sensing at regular intervals.

Following block 54, the method proceeds to block 56 where particular sensor events are identified from the sensor data. This may for example be accomplished with a controller solely or in conjunction with memory. By way of example, a sensor event may be associated with absolute or relative data. For example whether the data has changed a specified amount or whether the data has reached a specified level.

Following block 56, the method proceeds to block 58 where functions or commands assigned to sensor/sensor events are implemented when the sensor events are identified. This may for example be accomplished with a controller solely or in conjunction with memory. Again, individual sensor events from a single sensor may be used to drive a particular functionality or multiple sensor events from multiple sensors may be used to drive a particular functionality.

A wide range of commands can generated. The commands can include changing modes (e.g., input/hold, vibrate/ring), launching a program, opening a file (e.g., playlist 1/playlist2), adjusting a control (e.g., volume, play/pause, backlighting, powering up/down, etc.), viewing a menu, executing instructions, logging onto the device, permitting access to restricted areas, loading a user profile, and/or the like.

Table 1 shows several examples of functions that can be assigned to particular sensor read outs.

TABLE 1

| SENSOR | SENSOR EVENT | FUNCTION |
| --- | --- | --- |
| Light Sensor | Dark/Light | Hold Mode/Input Mode |
| Light Sensor | Dark/Light | Vibrate mode/Ring mode |
| Light Sensor | Dark/Light | Music Mode 1/Music Mode 2 |
| Light Sensor | Dark/Light | Backlighting Low/High |
| Force Sensor | Hard/Light(No) | Input Mode/Hold mode |
| Touch Sensor | Touch/No Touch | Input Mode/Hold mode |
| Temp. Sensor | High/Low | Input Mode/Hold Mode |
| Noise Sensor | High/Low | Ring Volume High/Low |
| Noise Sensor | High/Low | Head Set Volume High/Low |
| Clock | Time 1/Time 2 | Ring Volume High/Low |
| Orientation Sensor | Upright/Upside Down | Input Mode/Hold Mode |
| Motion Sensor | High/Low | Play/Pause |
| Motion Sensor | High/Low | Music Mode 1/Music Mode 2 |
| Motion Sensor & Orientation Sensor | No Motion One location | Power Down |

It should be appreciated that Table 1 is shown by way of example and not by way of limitation. It is conceivable that any function (even those not mentioned) can be mapped to any combination of sensor/sensor event (even those not mentioned). For example, although ring/vibrate mode was applied to the light sensor in Table 1, it should be noted that this is not a limitation and it can be performed from force sensing, touch sensing, etc. Furthermore, although not shown in Table 1, it should be realized that it may be advantageous to utilize multiple sensor events for determining whether a particular function should be implemented. For example, any combination of sensor events can be selected to determine whether a device should be placed in hold mode or input mode (e.g., light sensor and touch). In fact, using a menu, a user may simply enable/disable any of sensor/sensor events means associated with a particular function to get their desired configuration. For example, the user can pick which sensors they would like to use to control the hold/input modes.

Figure 3:
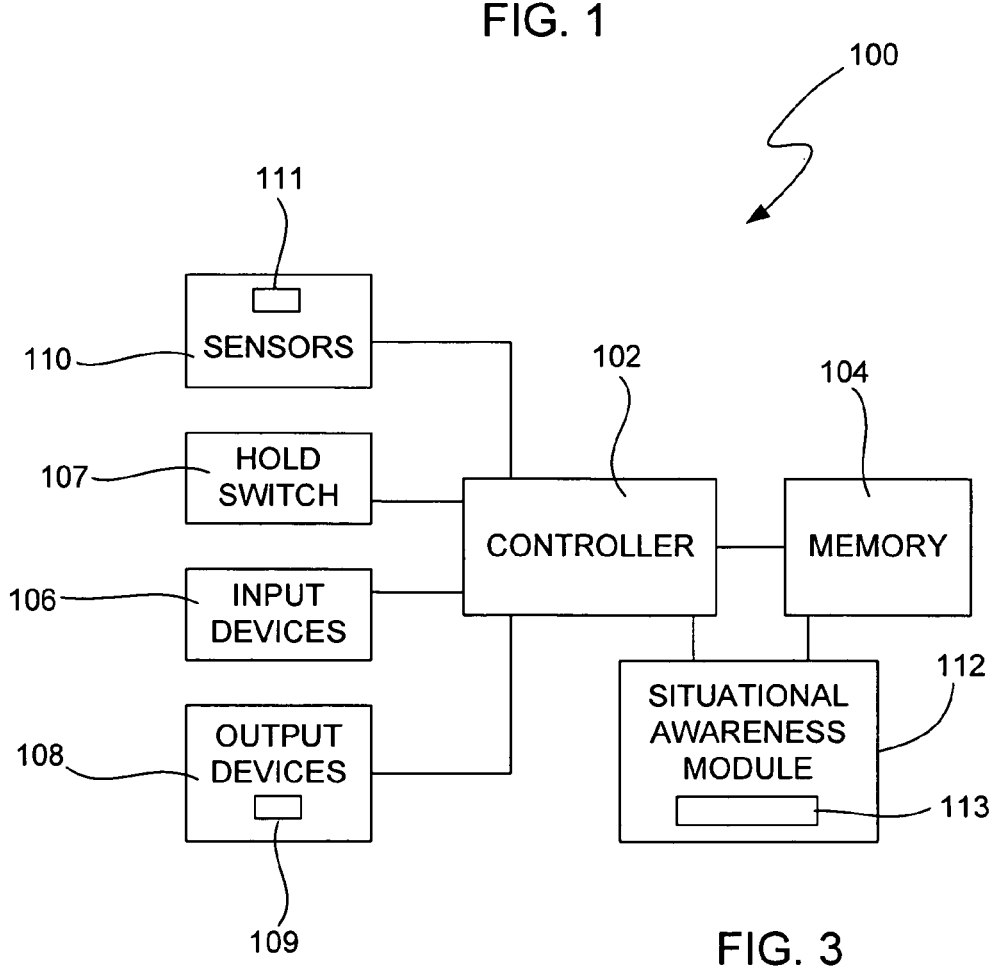
FIG. 3 is a block diagram of a portable electronic device, in accordance with one embodiment of the present invention.

FIG. 3 is a block diagram of a portable electronic device 100, in accordance with one embodiment of the present invention. The portable electronic device may be a handheld device and further a pocket sized handheld device. The portable electronic device may for example be selected from PDA, Cell Phone, Music Player (e.g., MP3), Video Player (e.g., DVD), Game Player, Camera, Handtop, Internet terminal, remote control, GPS device, and the like.

The portable electronic device 100 typically includes a controller 102 (e.g., CPU) configured to execute instructions and to carry out operations associated with the portable electronic device 100. For example, using instructions retrieved for example from memory, the controller 102 may control the reception and manipulation of input and output data between components of the portable electronic device 100. The controller 102 can be implemented on a single-chip, multiple chips or multiple electrical components. For example, various architectures can be used for the controller 102, including dedicated or embedded processor, single purpose processor, controller, ASIC, and so forth. By way of example, the controller 102 may include microprocessors, DSP, A/D converters, D/A converters, compression, decompression, etc.

In most cases, the controller 102 together with an operating system operates to execute computer code and produce and use data. The operating system may correspond to well known operating systems such as OSX, OS/2, Windows, DOS, Unix, Linux, and Palm OS, or alternatively to special purpose operating system, such as those used for limited purpose appliance-type devices.

The operating system, other computer code and data may reside within a memory block 104 that is operatively coupled to the controller 102. Memory block 104 generally provides a place to store computer code and data that are used by the portable electronic device 100. By way of example, the memory block 104 may include Read-Only Memory (ROM), Random-Access Memory (RAM), hard disk drive (micro drive), flash memory and/or the like.

In conjunction with the memory block 104, the portable device 100 may also include a removable storage device such as an optical disc player that receives and plays DVDs, or card slots for receiving mediums such as memory cards (or memory sticks). In the case of some smaller handheld devices, the optical drive may only be configured for mini DVDs.

The portable electronic device 100 also includes one or more input devices 106 that are operatively coupled to the controller 102. The input devices 106 allow a user to interact with the hand held electronic device 100. For example, they allow a user to input data into the handheld electronic device 106. The input devices 106 may take a variety of forms including for example buttons, switches, wheels, dials, keys, keypads, navigation pads, joysticks, touch screens, touch pads, touch housings, microphone, trackball, etc.

In order to prevent accidental entries by the input devices, the portable electronic device 100 may also include a manual hold switch 107. The manual hold switch 107 is configured to activate and deactivate all or a select number of the input devices by simply sliding a mechanical actuator from one position to another position (ON/OFF). This is generally done to prevent unwanted entries, as for example, when the device 100 is stored inside a user's pocket. That is, the hold switch 107 prevents inadvertent or accidental entries that may occur while the device is being carried. When the switch 107 is placed in a first position or state, signals from the input means are not sent or are disregarded by the device (e.g., hold mode). When the switch 107 is placed in a second position or state, signals from the input means are sent and therefore received and processed by the device (e.g., input mode). The hold switch 107 not only deactivate mechanical actuators such as buttons but also electronic actuators such as touch screens or touch surfaces, etc.

In one embodiment, all the input devices are affected by the hold switch. That is, placing the actuator in the ON position causes all the input devices to be disabled. In another embodiment, only a select number of input devices are affected by the hold switch. That is, placing the actuator in the ON position causes a predetermined portion of the input devices to be disabled. As should be appreciated, some input devices are less likely to cause unwanted entries and therefore they may not need to be placed in the hold mode.

In one example, when the hold switch is set to OFF, the user interface sends a message to the controller that describes the status of the input devices (e.g., button status, touch pad position, etc.). In some cases, the message is only sent when the status of one or all of the input devices changes. For example, when a button has been pressed. When the hold switch is set to ON, the user interface does not send a message to the controller. When the hold switch is toggled from ON to OFF, the user interface sends a message to the controller. When the hold switch is toggled from OFF to ON, the user interface does not send a message to the controller.

The portable electronic device 100 also includes one or more output devices 108 that are operatively coupled to the controller 102. The output devices 108 allow the portable electronic device 100 to interact with the user. For example, they allow the handheld electronic device 100 to output data associated with the portable electronic device 100 to the user. The output devices 108 may take a variety of forms including for example a display, speakers (or headset), audio/tactile feedback devices (e.g., haptics), indicators, etc.

At the very least, the output devices 108 typically include a display 109 for displaying a graphical user interface GUI including perhaps a pointer or cursor as well as other information to the user. The GUI provides an easy to use interface between a user of the portable electronic device 100 and the operating system or applications running thereon. Generally speaking, the GUI represents, programs, files and various selectable options with graphical images. The GUI can additionally or alternatively display information, such as non interactive text and graphics, for the user of the handheld electronic device 100. The display may also be used to display images or play video.

The display 109 is typically selected from flat panel devices although this is not a requirement and other types of displays may be utilized. Flat panel devices typically provide a planar platform that is suitable for hand-held devices 100. By way of example, the display 109 may correspond to a liquid crystal display (LCD) such as a character LCD that is capable of presenting text and symbols or a graphical LCD that is capable of presenting images, video, and graphical user interfaces (GUI). Alternatively, the display 109 may correspond to a display based on organic light emitting diodes (OLED), or a display that is based on electronic inks.

The configuration of input and output devices typically vary according to the type of portable electronic device.

In order to anticipate the operational needs of the user (or provide situational awareness), the portable electronic device 100 may also include one or more sensors 110 that are operatively coupled to the controller 102. The sensors 110 are configured to transfer data from the outside world into the portable device 100 so that the portable electronic device 100 can determine how the device 100 should be configured or controlled (e.g., each environmental attribute provides cues to how the user would prefer to use or control the device). For example, information collected by the sensors 110 may help the controller 102 determine what mode the device should be operating in and/or how to adjust a control feature. The sensors 110 may take a variety of forms including light sensors (e.g., photodiode, phototransistor, photoresistor), motion sensors (e.g., accelerometers), vibration sensors, force sensors (e.g., capacitance, resistance), touch sensors (e.g., capacitance, resistance), temperature sensors, pressure sensors (e.g., load cells), image sensors (e.g., CCD, CMOS), noise sensors, clocks, and/or the like.

Any number of sensors in any combination may be used to drive one or more commands.

In one embodiment, the output of a single sensor is used to drive a command. For example, the output from a single light sensor may be used to drive a mode command such as input/hold mode.

In another embodiment, the outputs of multiple sensors of the same type are used to drive a command. This may be done to average values produced therefrom or so that the device can compare/select between multiple values produced therefrom. By way of example, the outputs from multiple light sensors at different locations may be used to drive a mode command such as input/hold.

In another embodiment, the outputs of multiple sensors of different types may be used to drive a command. This may help the device narrow down a particular configuration of the device (e.g., needs at least two sets of information to make decision). Any combination of sensors may be used including but not limited by light/motion, light/vibration, light/touch, light/force, light/temperature, light/noise, light/orientation, light/clock, motion/vibration, motion/touch, motion/force, motion/temperature, motion/noise, motion/orientation, motion/clock, vibration/touch, vibration/force, vibration/temperature, vibration/noise, vibration/orientation, vibration/clock, touch/force, touch/temperature, touch/noise, touch/orientation, touch/clock, force/temperature, force/noise, force/orientation, force/clock, temperature/noise, temperature/orientation, temperature/clock, noise/orientation, noise/clock, orientation/clock, and/or the like. It should also be pointed out that the combination is not limited to only two sensors, but may also include combinations greater than two as for example light/motion/touch, light/motion/force, etc.

In another embodiment, the output of a single sensor type is used to drive multiple commands. For example, the output of a single light sensor may be used to drive to mode commands such as hold/input and ring/vibrate as well as to drive backlighting.

In another embodiment, the output of a multiple sensor types is used to drive multiple commands. For example, the output of a light sensor and motion sensor may be used to drive two mode commands such as hold/input and music model/music mode 2. In addition, the light sensor itself may be used to additionally drive another mode command such as vibrate/ring, and the motion sensor itself may be used to additionally drive a command for adjusting a control such as PLAY/PAUSE. Moreover, the light sensor or motion sensor may be combined with another sensor to drive other commands. For example, the motion sensor may also be combined with an orientation sensor to drive a command for adjusting a control such as POWER ON/OFF.

Furthermore, the sensors 111 may be positioned almost anywhere on or in the portable electronic device 100. They may be located at peripheral locations (at the surface) or they may be located at internal locations inside the device 100. Internal locations provide the added benefit of being hidden from view. Alternatively, the sensors 111 may be embedded within a housing wall of the device 100. For example, the device may have an optical transmissive layer on its outer surface within which a small light sensor can be embedded.

In some cases, the device 100 may include a situational awareness module 112 that obtains sensor data from the various sensors 111 and extracts control information from the sensor data. The control information can be used to control some aspect of the device 100 including for example changing modes (e.g., input/hold), adjusting controls (e.g, volume), etc. By way of example, the situational awareness module 112 may include tables 113 for interpreting the signals generated by the sensors 111. The tables 113 may for example map particular sensor event(s) to particular functions. In one implementation, the tables 113 may be accessed through a control menu that serves as a control panel for reviewing and/or customizing the operation of the device 100, i.e., the user may quickly and conveniently review the settings and make changes thereto. Once changed, the modified settings will be automatically saved and thereby employed to handle future processing. By way of example, the user may set the meaning of each sensor event. The device 100 is therefore user configurable or user programmable.

The situational awareness module may reside in the controller, memory and/or some other component of the device.

In accordance with one embodiment, one or more sensors 10 are included in the portable electronic device 100 to provide feedback that alerts the portable electronic device 100 when the portable electronic device 100 should be switched from one mode to another. The sensor output is related to a mode of the portable electronic device 100, and therefore the sensor output can be used to provide cues when the portable electronic device 100 should automatically change from one mode to the other (without waiting for a manual user selection).

In one embodiment, the sensor output provide cues for initiating an automatic switch between an input mode and a hold mode. That is, the sensors 10 provide information for determining when the portable electronic device 100 should switch from the input mode to the hold mode and from the hold mode to the input mode (without user selection each time). When the portable electronic device 100 is in the input mode, the input devices 106 of the portable electronic device are activated for use. That is, the input devices 106 are enabled to provide inputs into the portable electronic device 100. When the portable electronic device 100 is in a hold mode, the input devices 106 of the portable electronic device 100 are deactivated. That is, the input devices 106 are disabled or locked so that they are unable to provide inputs into the portable electronic device 100. This prevents operations from being interrupted and from inadvertently waking up and using unnecessary power (see Hold Switch above).

In one implementation, the portable electronic device 100 includes one or more ambient light sensors 111 configured to receive and measure the level of light that surrounds the portable electronic device 100. This type of light is sometimes referred to as ambient light. For example, the light that is produced by sunlight, incandescent light, fluorescent light and the like. The light sensor 111 may be a photodiode, phototransistor, photoresistor, and in some cases may even be embodied as a CMOS or CCD. During operation, the ambient light sensor(s) 111 measures the ambient light level surrounding the portable electronic device 100 and the controller 102 determines whether the measured ambient light level has changed a certain amount or reached a certain light threshold.

In one embodiment, the input mode is active in high ambient light and the hold mode is active in low ambient light. It is generally assumed that when placed in a dark environment, the portable electronic device 100 is not being used for inputting and thus inputting is locked. By way of example, the portable electronic device 100 may be placed in a pocket or bag or case or purse or possibly in such a dark environment that the user would simply not use the device. This feature is especially important when the portable electronic device 100 is loosely placed in a pocket or bag, as the device is typically jumbled around such that accidental inputs can be made.

The light sensor(s) 111 may be positioned at external locations (at the surface) or they may be located at internal locations inside the portable electronic device 100. When internally located, windows built into the housing of the portable electronic device 100 may be used to transmit light from outside the portable electronic device 100 to inside the portable electronic device 100 where the sensors 111 are located. Light conduits including holes or light pipes may also be used to direct the ambient light from outside the housing to inside the housing towards the light sensor(s) 111. The light conduits may form a window at the surface of the device or they may be placed behind a window. Furthermore, the light pipes may be formed form rigid or flexible materials that facilitate the transmission of light therethrough.

In one embodiment, the light sensors 111 are disposed inside the device so they are hidden from view. The light sensors 111 may be placed proximate the display 109 thereby utilizing the window that typically covers and protects the display 109.

In some cases, multiple ambient light sensors 111 may be used. This may help produce a more accurate reading of ambient light as for example through averaging. This may also help in determining whether the device is actually in a dark environment as opposed to when light is being blocked from getting to the light sensor 111 (e.g., if one sensor is blocked, the other is still sensing the ambient environment).

The sensor(s) 110 can be used alone or in combination with the hold switch 107 mentioned above. That is, the sensor(s) 110 can completely replace the manual hold switch 107, or they may be used in addition to the manual hold switch 107 or a modified manual hold switch 107. The sensors 110 typically provide the means to automatically switch between the input mode and hold mode (without user manipulation), while the manual hold switch 107 provides a means to physically switch between the input mode and hold mode. It is generally believed that providing both gives the user the greatest control over the portable electronic device 100.

Figures 4, 5, 6, 7, 8:
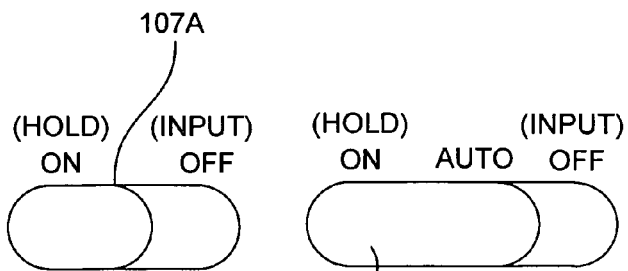
FIG. 4 is a diagram of a user preference window, in accordance with one embodiment of the present invention.
FIG. 5 is a diagram of a hold switch having two states, in accordance with one embodiment of the present invention.
FIG. 6 is a truth table, in accordance with one embodiment of the present invention.
FIG. 7 is a diagram of a hold switch having three states, in accordance with one embodiment of the present invention.
FIG. 8 is a truth table, in accordance with one embodiment of the present invention.

When used with a standard two state hold switch, the auto hold feature may be enabled/disabled using a GUI such as user preference window. As shown in FIG. 4, the GUI 120 may include a header called "auto hold feature", and two options—"enabled" and "disabled". The user can select one of these items by simply moving a highlight bar over one of them and pressing a selection button. Furthermore, as shown in FIG. 5, the hold switch 107A may include two states for switching between hold and input modes. The first state places the device in the hold mode and the second state places the device in the input mode. In one embodiment, when the auto hold feature of FIG. 4 is enabled and the hold switch of FIG. 5 is in the hold state, the auto hold feature is activated in accordance with the sensor output. When the auto hold feature of FIG. 4 is disabled and the hold switch of FIG. 5 is in the hold state, the auto hold feature is deactivated and thus the sensor output is ignored. In essence, the portable operates device only operates in accordance with the state of the hold switch when the auto hold feature is disabled. FIG. 6 is a truth table 130 in accordance with this embodiment.

When used with a modified hold switch such as a three state hold switch, the auto hold feature may be enabled using the hold switch (rather then using system configurations). As shown in FIG. 7, the hold switch 107B is configured with three positions or states rather than two. The third position is an auto hold position. Placing the switch in the auto hold position causes the device to automatically switch between input/hold modes based on the output of the sensor(s). FIG. 8 is a truth table 140 in accordance with this embodiment.

Alternatively, the physical hold switch may be eliminated altogether by the addition of sensors. In this embodiment, the device simply relies on menu preferences to engage the automatic hold feature based on the sensors alone. This might provide several advantages including for example eliminating a mechanical actuator, which is aesthetically unpleasing and which susceptible to wear and which introduces a weak point in the structure (e.g., drop test).

In some cases, the device includes an override feature in case a sensor fails. If the auto hold feature is engaged when not desirable, a user can enter a specific sequence of inputs in order to unlock the device. This would be helpful in the embodiments utilizing a standard two position hold switch or embodiments that eliminate the hold switch altogether. By way of example, the user may be prompted to enter a key code or perform an action that activates one of the other sensors (e.g., squeeze gesture in the case of force sensors).

Figure 9:
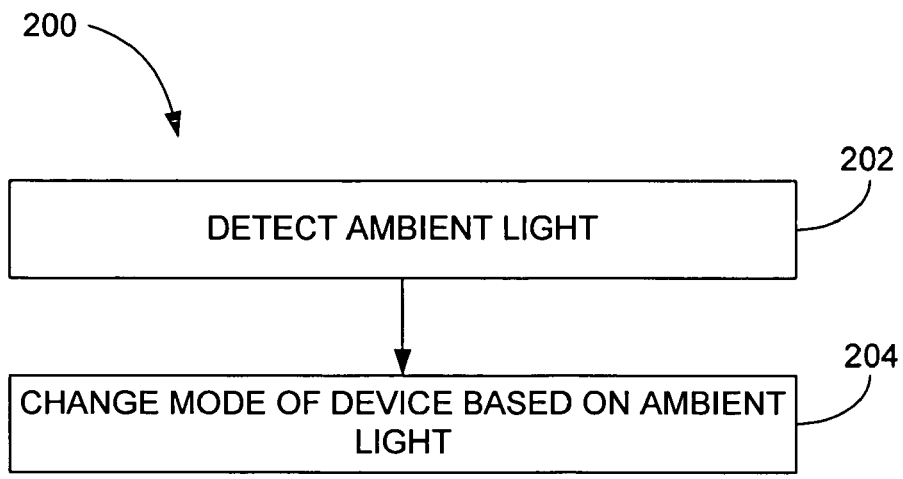
FIG. 9 is a method of operating a hand-held electronic device, in accordance with one embodiment of the present invention.

FIG. 9 is a method 200 of operating a hand-held electronic device, in accordance with one embodiment of the present invention. The method 200 includes block 202 where the ambient light level is detected. This may for example be accomplished with one or more photo detector that is positioned on or in the hand-held electronic device.

The method 200 also includes block 204 where the mode of the hand-held electronic device is changed based on the ambient light. For example, the hand-held electronic device may switch between an input mode and a hold mode based on the ambient light level. If the ambient light is low such as for example in a darkened environment such as inside a pocket or bag, then a hold mode is implemented. If the ambient light is high such as for example in a lightened environment surrounding the user, then the input mode is implemented. This particular embodiment is configured to anticipate when the user desires to input into the hand-held electronic device.

Figure 10:
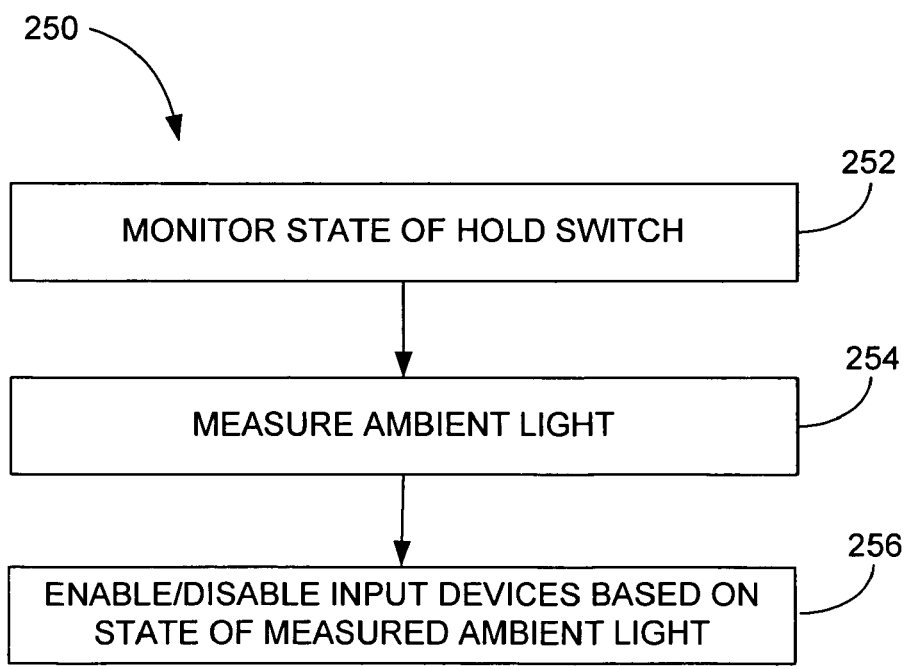
FIG. 10 is a method of operating a hand-held electronic device, in accordance with one embodiment of the present invention.

FIG. 10 is a method 250 of operating a hand-held electronic device, in accordance with one embodiment of the present invention. The method 250 includes block 252 where the state of a hold switch is monitored. For example, whether the hold switch is in the on or off or auto position.

The method also includes block 254 where the ambient light level is measured (detected). This may for example be accomplished with one or more photo detector that is positioned on or in the hand-held electronic device.

The method 250 also includes block 256 where the input devices are enabled/disabled based on the state of the measured ambient light level and the state of the hold switch. If the hold switch is in the auto position and the ambient light level is low, the input devices are disabled. If the hold switch is in the auto position and the ambient light level is high, the input devices are enabled.

Determining the state of ambient light level may be widely varied. In one example, if the measured light level is above a predetermined or specified threshold, the state of the ambient light level is considered high, and if the measured light level is below a predetermined or specified threshold, the state of the ambient light level is considered low. In some cases, a hysteresis loop may be provided in order to prevent the modes from switching back and forth at a particular threshold level. For example, an upper and lower threshold may be used. If the light level is above the upper threshold, the high state is outputted and if the light level is below the lower threshold, the low state is outputted. As should be appreciated, this provides a buffer between the upper and lower thresholds. In another example, if the current light level differs significantly from the previous light level (by a predetermined amount), the state of the ambient light level switches from a current state to a new state (e.g., from low to high or from high to low). For example, a switch may be initiated if the light level changes about 300 lux. Tables and equations and algorithms may also be used to determine the state of the ambient light level.

Figure 11:
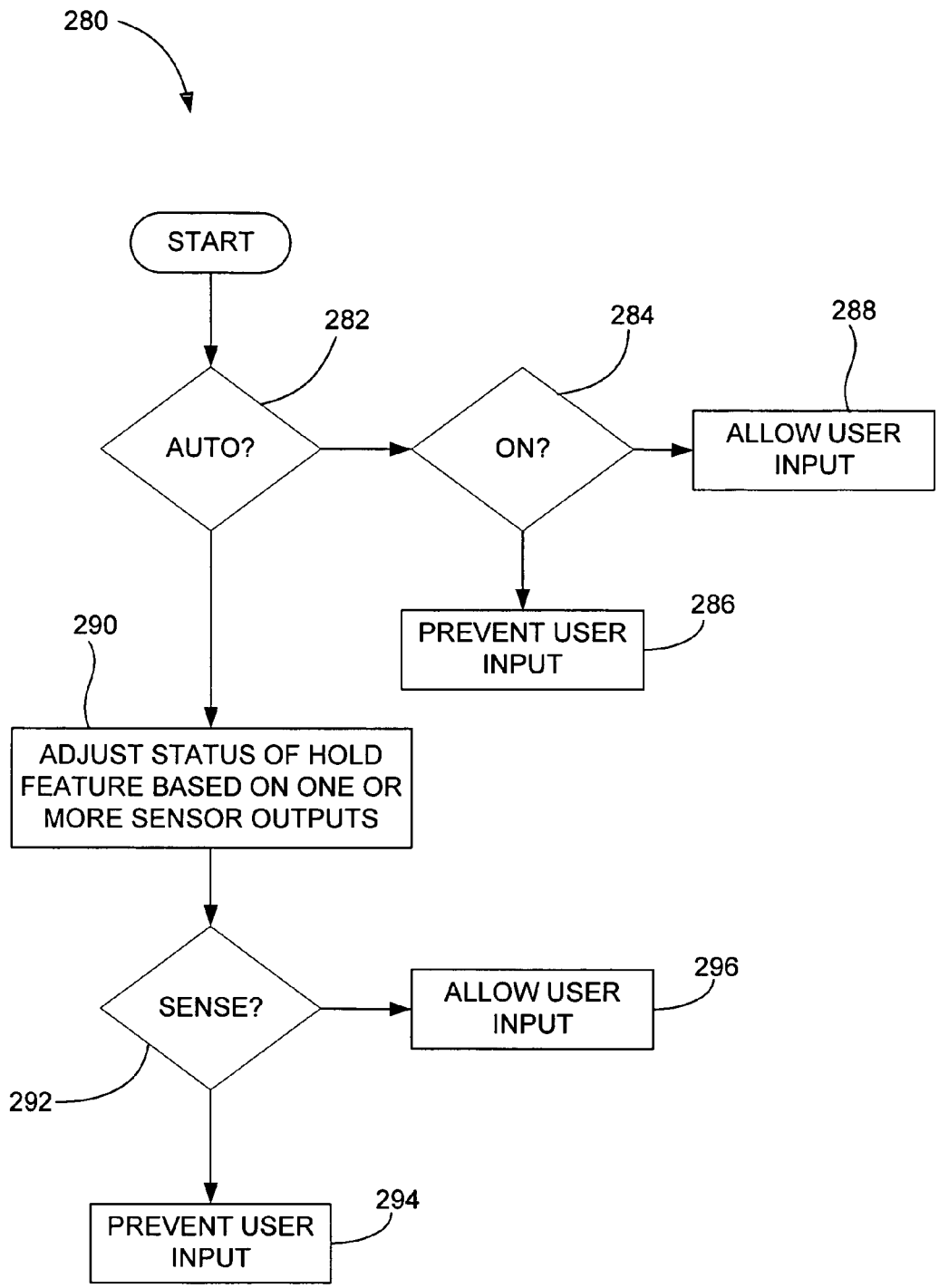
FIG. 11 is a method of operating a hand-held electronic device, in accordance with one embodiment of the present invention.

FIG. 11 is a method 280 of operating a hand-held electronic device, in accordance with one embodiment of the present invention. The method begins at block 282 where a determination is made as to whether an automatic hold feature is activated. This may for example be accomplished with a three state switch or a two state switch in combination with a user preference window. If the automatic hold feature is not active, the method proceeds to block 284 where a determination is made as to whether or not the hold feature is turned on. For example, if the switch is placed on the on or off position. If the hold feature is turned on, the method proceeds to block 286 where input devices are disabled in order to prevent user inputs. If the hold feature is turned off, the method proceeds to block 288 where input devices are enabled in order to allow user inputs to be made.

Referring back to block 282, if the automatic hold feature is active, the method proceeds to block 290 where the status of the hold feature (on, off) is adjusted based on one or more sensor inputs. For example, as shown in blocks 292-296, if a first condition is sensed, the method proceeds to block 294 where input devices are disabled in order to prevent user inputs. If a second condition is sensed, the method proceeds to block 296 where input devices are enabled in order to allow user inputs to be made. As mentioned previously, the sensor inputs can be widely varied including for example ambient light, temperature, motion, vibration, touch, pressure, etc.

In one embodiment, block 290 includes measuring the same environmental attribute at more then one location and averaging the result, and thereafter comparing the new result to a previous result or some sort of threshold. For example, producing a first condition if the difference between the new result and the previous result is high. Producing a second condition if the difference between the new result and the previous result is low. Alternatively or additionally, determining if the new result is above or below a threshold and initiating a first condition if above the threshold and initiating a second condition if below a threshold.

In another embodiment, block 290 includes measuring the same environmental attribute at more than one location and comparing the results from each location. If the results are substantially different, the status is held constant (not adjusted). If the results are substantially similar or the same, the status is adjusted. In the case of ambient light sensors, this may help differentiate when the device is just sitting on a table (lighted environment) and when the device is actually in a pocket or bag (dark environment). For example, if two ambient light sensors are used at different locations, a light/light condition will be considered a light condition, a light/dark condition will be considered a light condition and a dark/dark condition will be considered a dark condition. The light condition initiating the input mode. The dark condition initiating the hold mode.

In another embodiment, block 290 includes measuring different environmental attributes and adjusting the hold feature when each has achieved a predetermined or specified threshold.

Figure 12:
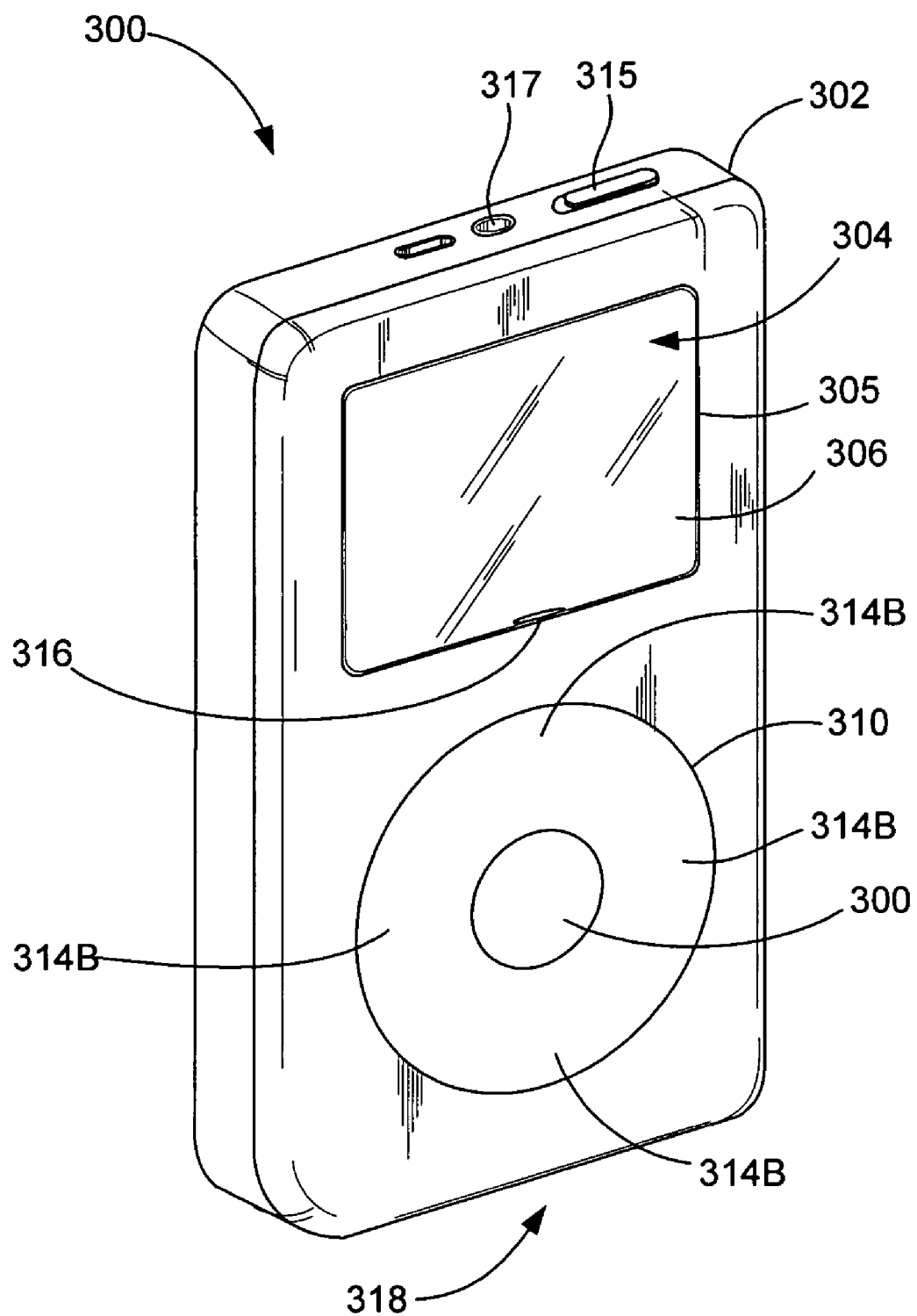
FIG. 12 is perspective view of a pocket sized handheld media player, in accordance with one embodiment of the present invention.

FIG. 12 is perspective view of a pocket sized handheld media player 300, in accordance with one embodiment of the present invention. The term "media player" generally refers to devices that are dedicated to processing media such as audio, video or other images, as for example, music players, game players, video players and the like. In some cases, the media players contain single functionality (e.g., a media player dedicated to playing music) and in other cases the media players contain multiple functionality (e.g., a media player that plays music, displays video, stores pictures and the like). With regards to being handheld, the device 300 can be operated and held solely by the user's hand. By being pocket sized, the player is preferably sized for placement into a pocket of the user so that the device can be taken almost anywhere the user travels (e.g., the user is not limited by carrying a large, bulky and heavy device). By way of example, the media player may correspond to the iPod® series music/photo/video players manufactured by Apple Computer of Cupertino, Calif.

As shown, the media player 300 includes a housing 302 that encloses internally various electrical components (including integrated circuit chips and other circuitry) to provide computing operations for the media player 300. For example, components used to process, input and output media such as music, photos, games, video and the like. The integrated circuit chips and other circuitry may include microprocessors, memory (e.g., hard drive, RAM, ROM, flash, etc.), battery, circuit board, input/output (I/O) support circuitry, amplifier, digital signal processors (DSP), etc.

The media player 300 also includes a display 304. The display 304, which is assembled within the housing 302 and which is visible through an opening in the housing 302, is used to display a graphical user interface (GUI) as well as other information to the user (e.g., text, objects, graphics). The GUI may visually provide music, photo, game and video menus, as well as controls thereof to the user. The display 304 generally takes the form of a flat panel display such as a liquid crystal display (LCD).

In most cases, the display screen 104 is visible to a user of the media player 100 through an opening 105 in the housing 102, and through a transparent wall 106 that is disposed in front of the opening 105. Although transparent, the transparent wall 106 may be considered part of the housing 102 since it helps to define the shape or form of the media player 100.

The media player 300 also includes a touch pad 310. The touch pad is an intuitive interface that provides easy one-handed operation, i.e., lets a user interact with the media player 100 with one or more fingers. The touch pad 310 is configured to provide one or more control functions for controlling various applications associated with the media player 100. For example, the touch initiated control function may be used to move an object on the display screen 304 or to make selections or issue commands associated with operating the media player 300. In order to implement the touch initiated control function, the touch pad 310 may be arranged to receive input from a finger moving across the surface of the touch pad 310, from a finger holding a particular position on the touch pad and/or by a finger tapping on a particular position of the touch pad.

The position of the touch pad 310 relative to the housing 302 may be widely varied. For example, the touch pad 310 may be placed at any external surface (e.g., top, side, front, or back) of the housing 302 that is accessible to a user during manipulation of the media player 300. In most cases, the touch sensitive surface 311 of the touch pad 310 is completely exposed to the user. In the illustrated embodiment, the touch pad 310 is located in a lower, front area of the housing 302. Furthermore, the touch pad 310 may be recessed below, level with, or extend above the surface of the housing 302. In the illustrated embodiment, the touch sensitive surface 311 of the touch pad 310 is substantially flush with the external surface of the housing 302.

Moreover, the shape of the touch pad 310 may also be widely varied. For example, the touch pad 310 may be circular, rectangular, triangular, and the like. In general, the outer perimeter of the shaped touch pad defines the working boundary of the touch pad. In one embodiment, the touch pad 310 is circular. More particularly, the touch pad is annular, i.e., shaped like or forming a ring. When annular, the inner and outer perimeter of the shaped touch pad defines the working boundary of the touch pad.

The manner in which the circular touch pad 110 receives input may be widely varied. In one embodiment, the touch pad 110 is configured receive input from a linear finger motion. In another embodiment, the touch pad 110 is configured receive input from a rotary or swirling finger motion. In yet another embodiment, the touch pad 110 is configured receive input from a radial finger motion. Additionally or alternatively, the touch pad 110 may be arranged to receive input from a finger tapping on the touch pad 100. By way of example, the tapping finger may initiate a control function for playing a song, opening a menu and the like.

In one embodiment, the control function corresponds to a scrolling feature. For example, the moving finger may initiate a control function for scrolling through a song menu displayed on the display screen 104. The term "scrolling" as used herein generally pertains to moving displayed data or images (e.g., text or graphics) across a viewing area on a display screen 104 so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen 104 or it may only be a portion of the display screen 104 (e.g., a window frame).

The direction of scrolling may be widely varied. For example, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area. In one implementation, the scrolling feature may be used to move a Graphical User Interface (GUI) vertically (up and down), or horizontally (left and right) in order to bring more data into view on a display screen. By way of example, in the case of an MP3 player, the scrolling feature may be used to help browse through songs stored in the MP3 player. The direction that the finger moves may be arranged to control the direction of scrolling. For example, the touch pad may be arranged to move the GUI vertically up when the finger is moved in a first direction and vertically down when the finger is moved in a second direction To elaborate, the display screen 104, during operation, may display a list of media items (e.g., songs). A user of the media player 100 is able to linearly scroll through the list of media items by moving his or her finger across the touch pad 110. As the finger moves around the touch pad 110, the displayed items from the list of media items are varied such that the user is able to effectively scroll through the list of media items. However, since the list of media items can be rather lengthy, the invention provides the ability for the user to rapidly traverse (or scroll) through the list of media items. In effect, the user is able to accelerate their traversal of the list of media items by moving his or her finger at greater speeds.

In one embodiment, the media player 100 via the touch pad 110 is configured to transform a swirling or whirling motion of a finger into translational or linear motion, as in scrolling, on the display screen 104. In this embodiment, the touch pad 110 is configured to determine the angular location, direction, speed and acceleration of the finger when the finger is moved across the top planar surface of the touch pad 110 in a rotating manner, and to transform this information into signals that initiate linear scrolling on the display screen 104. In another embodiment, the media player 100 via the touch pad 110 is configured to transform radial motion of a finger into translational or linear motion, as in scrolling, on the display screen 104. In this embodiment, the touch pad 110 is configured to determine the radial location, direction, speed and acceleration of the finger when the finger is moved across the top planar surface of the touch pad 110 in a radial manner, and to transform this information into signals that initiate linear scrolling on the display screen 104. In another embodiment, the media player 100 via the touch pad 202 is configured to transform both angular and radial motion of a finger into translational or linear motion, as in scrolling, on the display screen 104.

In addition to above, the media player 300 may also include one or more buttons 314. The buttons 314 are configured to provide one or more dedicated control functions for making selections or issuing commands associated with operating the media player 300. By way of example, in the case of a music or video player, the button functions may be associated with opening a menu, playing media, fast forwarding a song, seeking through a menu and the like. The buttons 314 may be mechanical clicking buttons and/or they may be touch buttons. In some cases, the buttons whether mechanical or electrical may be integrated with the touch pad. In the illustrated embodiment, the device includes a center button and a touch pad that provides the mechanical clicking action necessary for four control buttons. One advantage of this user interface is that in order to play a song on the device, the user is only required to highlight a new song by rotating their finger about the touch pad, and then select the new song by clicking the center button.

Examples of various touch pad/button arrangements may be found in U.S. patent application Ser. Nos. 10/188,182, 10/722,948, and 10/643,256, which are all herein incorporated by reference. Examples of other touch devices such as touch screens or touch sensitive housings that are overlaid on top of the display may be found in U.S. patent application Ser. Nos. 10/840,862, 11/057,050, 11/115,539, 60/663,345 and 60/658,777, which are all herein incorporated by reference.

The media player 300 may also include a hold feature configured to activate or deactivate the touch pad and/or buttons (e.g., main user input devices). This is generally done to prevent unwanted commands by the touch pad and/or buttons, as for example, when the media player is stored inside a user's pocket. When deactivated, signals from the buttons and/or touch pad are not sent or are disregarded by the media player. When activated, signals from the buttons and/or touch pad are sent and therefore received and processed by the media player. The hold feature includes a hold switch 315 and at least one ambient light sensor 316. The hold switch 315 may be a two state or three state switch as shown in FIGS. 4 and 6. The ambient light sensor 316 may be a photodiode, phototransistor, photoresistor.

The position of the hold switch 315 relative to the housing 302 may be widely varied. For example, the hold switch 315 may be placed at any external surface (e.g., top, side, front, or back) of the housing 302 that is accessible to a user during manipulation of the media player 300. In the illustrated embodiment, the hold switch 315 is located on the top surface of the housing.

The position of the light sensor 316 may also be widely varied. The light receiving portion of the light sensor may be located at the surface of the housing or alternatively inside the housing so that its hidden from view. The light receiving portion may be a hole or window built into the housing, the end of a light pipe, or the sensor itself. In the illustrated embodiment, the light receiving portion of the sensor is positioned at the edge of the display behind the clear window laid over the display. In this way, the light receiving portion as well as the sensor is hidden from view. Further, it does not affect the industrial design surfaces of the housing (e.g., no breaks or lines in the surface). In one implementation, the light sensor is mounted on the main circuit board of the device either at a location that places it at the edge of the display or at an interior location away from the display but using a light pipe from the sensor to the edge of the display.

Although only one sensor is shown, it should be noted that this is not a limitation and that multiple sensors may be used. For example, a first sensor may be located at the bottom of the display and a second sensor located at the top of the display or sensors may be located at the right and left sides of the display. Alternatively, each side may include a sensor or each corner of the display may include a sensor. Furthermore, sensors may be located at the top, bottom, side or back surface of the housing. Any combination may be used. Some locations may be more strategic than others. For example, in some cases, it may be preferable to have a sensor at the front and back of the device in order to determine if the device is laying on a surface rather than in a pocket. This prevents the device from changing modes simply because the sensor is face down on a table. The device poles the sensors and if one of them has a high condition, then the device stays or is placed in the input mode. The same functionality can be performed with a sensor located at the sides.

The media player 300 may also include one or more headphone jacks 317 and one or more data ports 318. The headphone jack 316 is capable of receiving a headphone connector associated with headphones configured for listening to sound being outputted by the media device 300. The data port 318, on the other hand, is capable of receiving a data connector/cable assembly configured for transmitting and receiving data to and from a host device such as a general purpose computer (e.g., desktop computer, portable computer). By way of example, the data port 318 may be used to upload or down load audio, video and other images to and from the media device 300. For example, the data port may be used to download songs and play lists, audio books, ebooks, photos, and the like into the storage mechanism of the media player.

The data port 318 may be widely varied. For example, the data port may be a PS/2 port, a serial port, a parallel port, a USB port, a Firewire port and/or the like. In some cases, the data port 318 may be a radio frequency (RF) link or optical infrared (IR) link to eliminate the need for a cable. The media player 100 may also include a power port that receives a power connector/cable assembly configured for delivering powering to the media player 300. In some cases, the data port 318 may serve as both a data and power port. In the illustrated embodiment, the data port 318 is a Firewire port having both data and power capabilities.

Although only one data port is described, it should be noted that this is not a limitation and that multiple data ports may be incorporated into the media player. In a similar vein, the data port may include multiple data functionality, i.e., integrating the functionality of multiple data ports into a single data port. Furthermore, it should be noted that the position of the hold switch, headphone jack and data port on the housing may be widely varied. That is, they are not limited to the positions shown. They may be positioned almost anywhere on the housing (e.g., front, back, sides, top, bottom). For example, the data port may be positioned on the bottom surface of the housing rather than the top surface as shown.

By way of example, the media player described in FIG. 11 may generally correspond to any of various iPod media players manufactured by Apple Computer Inc., of Cupertino, Calif.

Figure 13:
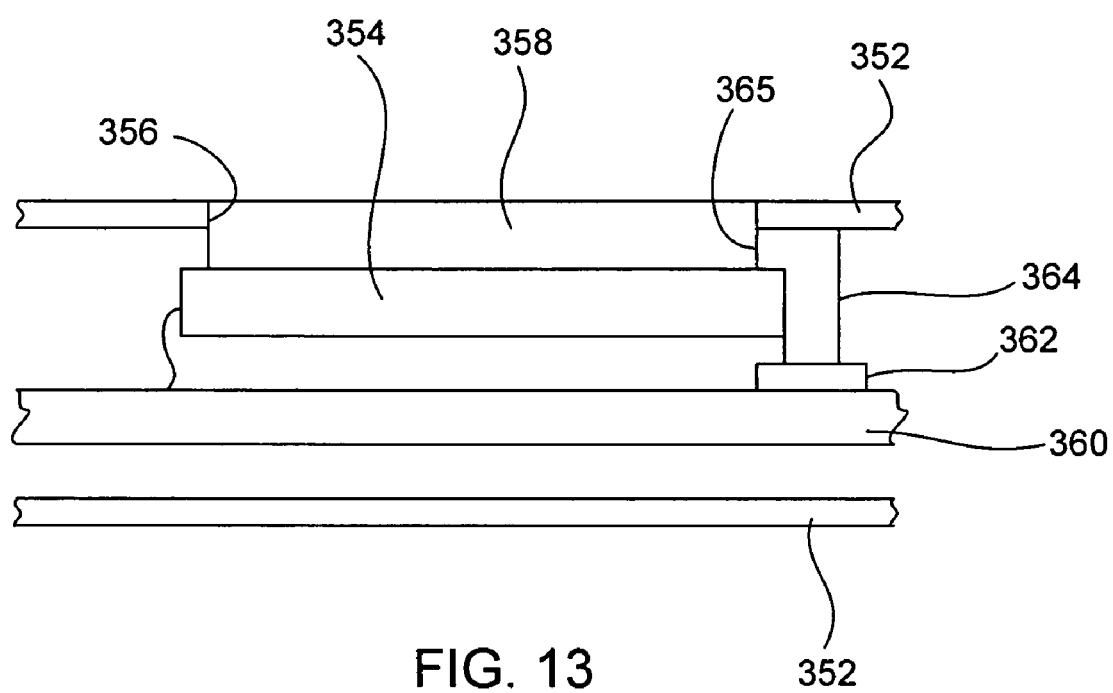
FIG. 13 is a side elevation view, in cross section, of a media player, in accordance with one embodiment of the present invention.

FIG. 13 is a side elevation view, in cross section, of a media player 350, in accordance with one embodiment of the present invention. The media player 350 may for example correspond to the media player shown and described in FIG. 12. In this embodiment, the media player 350 includes a housing 352 that encloses the internal components of the media player 350. The media player 350 also includes a display 354 which is assembled within the housing 352 and which is visible through an opening 356 in the housing 352. In some cases, the housing 352 may include a window 358, which is positioned in the opening 356 in front of the display 354 in order to protect the display 354 from damage. The window 358 is typically formed from a clear material such as clear polycarbonate plastic.

The media player 350 also includes a main circuit board 360 disposed inside the housing 352. The main circuit board 360 may include the various components discussed in FIG. 2 including for example a processor, memory, etc. In the illustrated embodiment, a light sensor 362 is also mounted to the main circuit board 360 inside the housing 352. A light pipe 364 is used to pipe light from outside the housing 352 to inside the housing 352 where the light sensor 362 is located. The light receiving end 365 of the light pipe 364 is located at the bottom edge of the display 354 so that it can pick up light incident on the window 358. The light pipe 364 directs light incident on the window 358 to the light sensor 362 located inside the housing 352. The light pipe 362 may be a portion of the window 358 or it may be a separate component as shown. In some cases, the light receiving end may be angled away from the display towards the incident light. Alternatively, the light sensor 362 may be mounted on the circuit board 360 in a position that places it proximate the bottom edge of the display 354. In cases such as this, a light pipe is not necessary (unless piping light from another location altogether).

Figure 14:
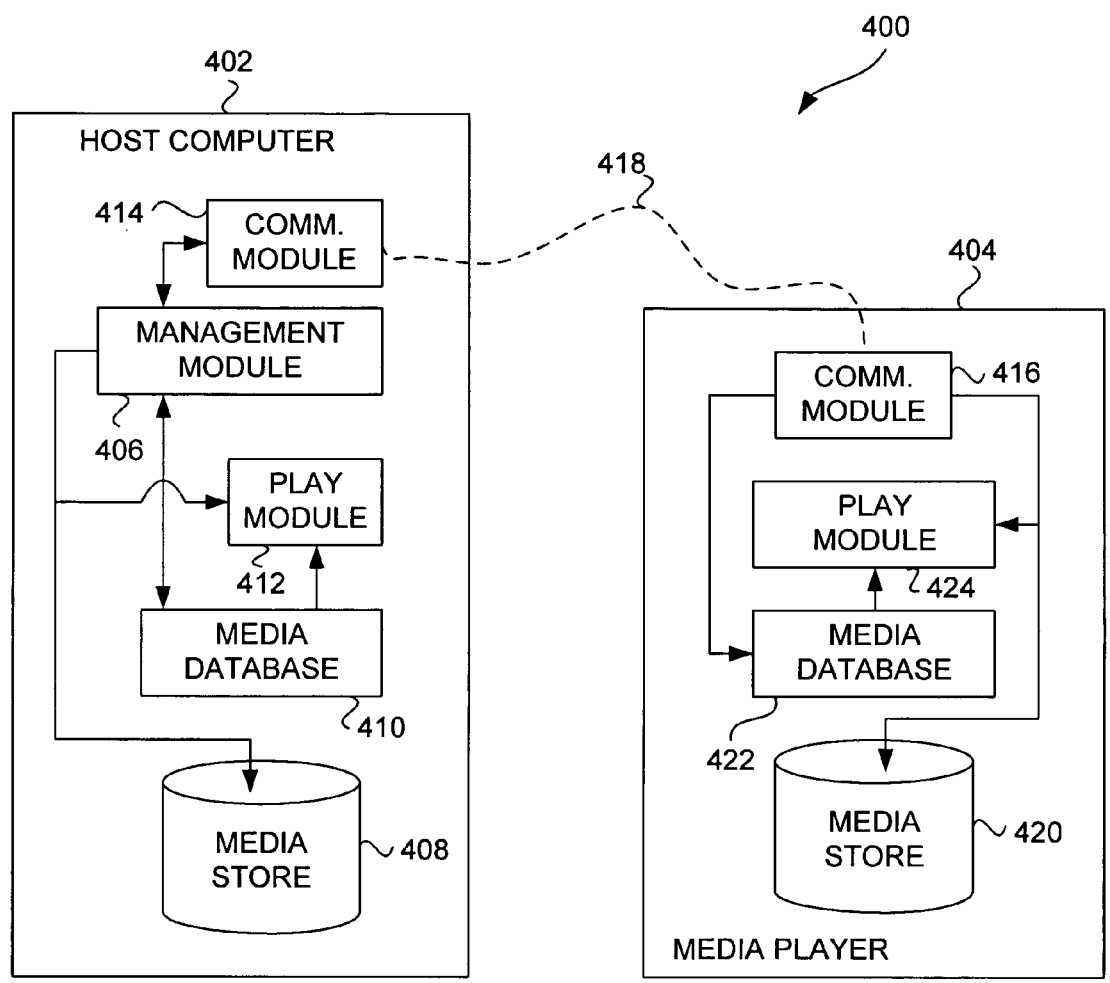
FIG. 14 is a block diagram of a media management system, in accordance with one embodiment of the present invention.

FIG. 14 is a block diagram of a media management system 400, in accordance with one embodiment of the present invention. The media management system 400 includes a host computer 402 and a media player 404. The host computer 402 is typically a personal computer. The host computer, among other conventional components, includes a management module 406, which is a software module. The management module 406 provides for centralized management of media items (and/or playlists) not only on the host computer 402 but also on the media player 404. More particularly, the management module 406 manages those media items stored in a media store 408 associated with the host computer 402. The management module 406 also interacts with a media database 410 to store media information associated with the media items stored in the media store 408.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 402 includes a play module 412. The play module 412 is a software module that can be utilized to play certain media items stored in the media store 408. The play module 412 can also display (on a display screen) or otherwise utilize media information from the media database 410. Typically, the media information of interest corresponds to the media items to be played by the play module 412.

The host computer 402 also includes a communication module 414 that couples to a corresponding communication module 416 within the media player 404. A connection or link 418 removeably couples the communication modules 414 and 416. In one embodiment, the connection or link 418 is a cable that provides a data bus, such as a FIREWIRE™ bus or USB bus, which is well known in the art. In another embodiment, the connection or link 418 is a wireless channel or connection through a wireless network. Hence, depending on implementation, the communication modules 414 and 416 may communicate in a wired or wireless manner.

The media player 404 also includes a media store 420 that stores media items within the media player 404. The media items being stored to the media store 420 are typically received over the connection or link 418 from the host computer 402. More particularly, the management module 406 sends all or certain of those media items residing on the media store 408 over the connection or link 418 to the media store 420 within the media player 404. Additionally, the corresponding media information for the media items that is also delivered to the media player 404 from the host computer 402 can be stored in a media database 422. In this regard, certain media information from the media database 410 within the host computer 402 can be sent to the media database 422 within the media player 404 over the connection or link 418. Still further, playlists identifying certain of the media items can also be sent by the management module 406 over the connection or link 418 to the media store 420 or the media database 422 within the media player 404.

Furthermore, the media player 404 includes a play module 424 that couples to the media store 420 and the media database 422. The play module 424 is a software module that can be utilized to play certain media items stored in the media store 420. The play module 424 can also display (on a display screen) or otherwise utilize media information from the media database 422. Typically, the media information of interest corresponds to the media items to be played by the play module 424.

Hence, in one embodiment, the media player 404 has limited or no capability to manage media items on the media player 404. However, the management module 406 within the host computer 402 can indirectly manage the media items residing on the media player 404. For example, to "add" a media item to the media player 404, the management module 406 serves to identify the media item to be added to the media player 404 from the media store 408 and then causes the identified media item to be delivered to the media player 404. As another example, to "delete" a media item from the media player 404, the management module 406 serves to identify the media item to be deleted from the media store 408 and then causes the identified media item to be deleted from the media player 404. As still another example, if changes (i.e., alterations) to characteristics of a media item were made at the host computer 402 using the management module 406, then such characteristics can also be carried over to the corresponding media item on the media player 404. In one implementation, the additions, deletions and/or changes occur in a batch-like process during synchronization of the media items on the media player 404 with the media items on the host computer 402.

In another embodiment, the media player 404 has limited or no capability to manage playlists on the media player 404. However, the management module 406 within the host computer 402 through management of the playlists residing on the host computer can indirectly manage the playlists residing on the media player 404. In this regard, additions, deletions or changes to playlists can be performed on the host computer 402 and then by carried over to the media player 404 when delivered thereto.

As previously noted, synchronization is a form of media management. The ability to automatically initiate synchronization was also previously discussed. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 15:
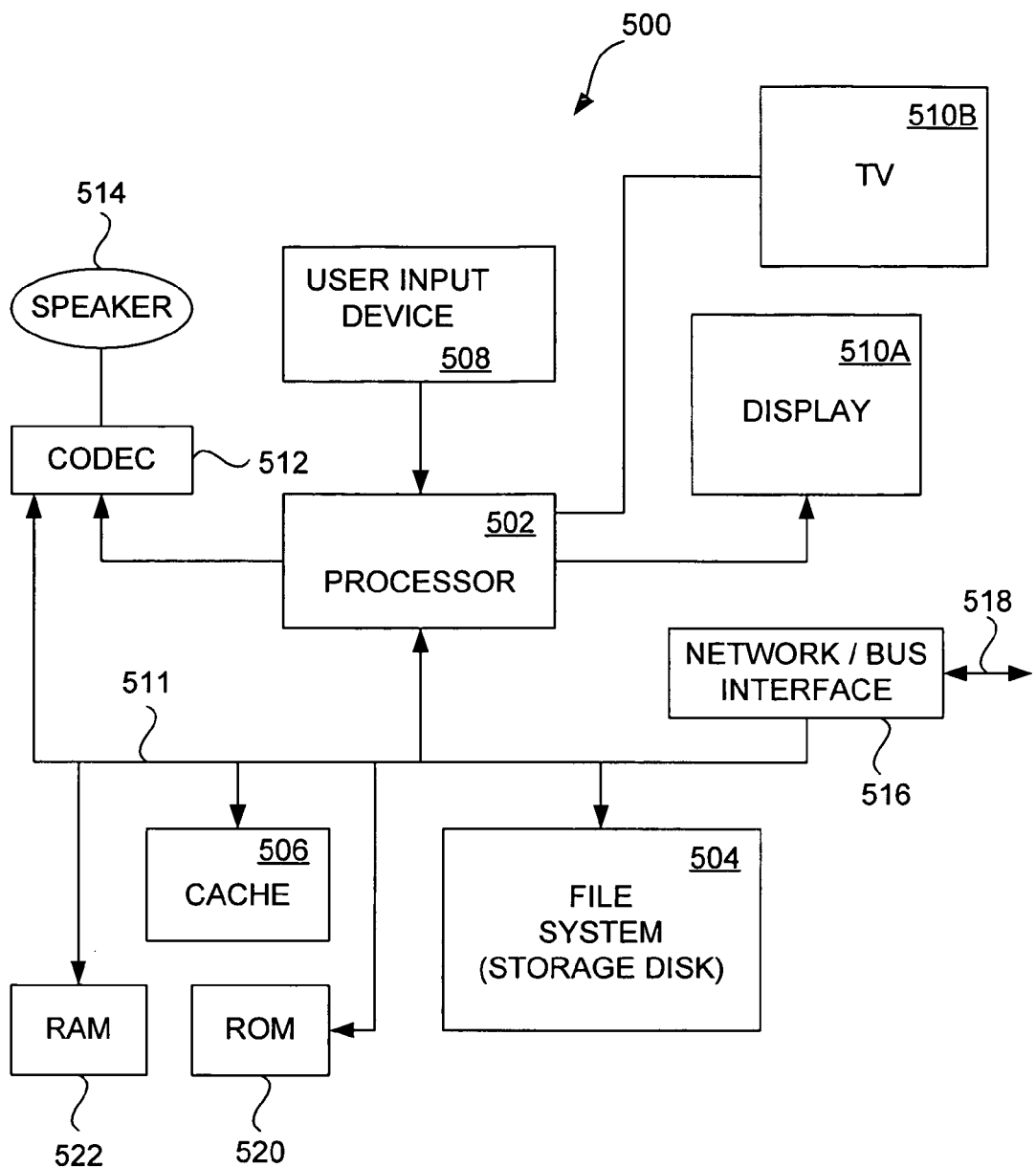
FIG. 15 is a block diagram of a media player, in accordance with one embodiment of the present invention.

FIG. 15 is a block diagram of a media player 500, in accordance with one embodiment of the present invention. The media player 500 includes a processor 502 that pertains to a microprocessor or controller for controlling the overall operation of the media player 500. The media player 500 stores media data pertaining to media items in a file system 504 and a cache 506. The file system 504 is, typically, a storage disk or a plurality of disks. The file system 504 typically provides high capacity storage capability for the media player 500. However, since the access time to the file system 504 is relatively slow, the media player 500 can also include a cache 506. The cache 506 is, for example, Random-Access Memory (RAM) provided by semiconductor memory. The relative access time to the cache 506 is substantially shorter than for the file system 504. However, the cache 506 does not have the large storage capacity of the file system 504. Further, the file system 504, when active, consumes more power than does the cache 506. The power consumption is often a concern when the media player 500 is a portable media player that is powered by a battery (not shown). The media player 500 also includes a RAM 520 and a Read-Only Memory (ROM) 522. The ROM 522 can store programs, utilities or processes to be executed in a non-volatile manner. The RAM 520 provides volatile data storage, such as for the cache 506.

The media player 500 also includes a user input device 508 that allows a user of the media player 500 to interact with the media player 500. For example, the user input device 508 can take a variety of forms, such as a button, keypad, dial, etc. Still further, the media player 500 includes a display 510 (screen display) that can be controlled by the processor 502 to display information to the user. A data bus 511 can facilitate data transfer between at least the file system 504, the cache 506, the processor 502, and the CODEC 512.

In one embodiment, the media player 500 serves to store a plurality of media items (e.g., songs) in the file system 504. When a user desires to have the media player play a particular media item, a list of available media items is displayed on the display 510. Then, using the user input device 508, a user can select one of the available media items. The processor 502, upon receiving a selection of a particular media item, supplies the media data (e.g., audio file) for the particular media item to a coder/decoder (CODEC) 1012. The CODEC 512 then produces analog output signals for a speaker 1014. The speaker 514 can be a speaker internal to the media player 500 or external to the media player 500. For example, headphones or earphones that connect to the media player 500 would be considered an external speaker.

The media player 500 also includes a network/bus interface 516 that couples to a data link 518. The data link 518 allows the media player 500 to couple to a host computer. The data link 518 can be provided over a wired connection or a wireless connection. In the case of a wireless connection, the network/bus interface 516 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

The wireless network, connection or channel can be radio-frequency based, so as to not require line-of-sight arrangement between sending and receiving devices. Hence, synchronization can be achieved while a media player remains in a bag, vehicle or other container.

The host device can also be a media player. In such case, the synchronization of media items can between two media players.

Although the media items of emphasis in several of the above embodiments were audio items (e.g., audio files or songs), the media items are not limited to audio items. For example, the media item can alternatively pertain to videos (e.g., movies) or images (e.g., photos).

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. For example, the portable handheld computing device may serve as a visual indicator for a host device or other device operatively coupled thereto. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A portable electronic device, comprising:
   a control mechanism that provides an input mode and a hold mode for the portable electronic device;
   one or more input devices for inputting into the portable electronic device; and
   one or more sensors that provide cues for initiating an automatic hold feature, the automatic hold feature including switching between the input and hold modes based on the sensor output, the input devices being enabled when the portable electronic device is in the input mode, the input devices being disabled when the device is in the hold mode, wherein the one or more sensors is configured to monitor an outer surface of the portable electronic device to determine whether a user's hand is contacting the outer surface of the device.

2. The portable electronic device as recited in claim 1 wherein the one or more sensors further include ambient light sensors configured to measure the level of light that surrounds the portable electronic device.

3. The portable electronic device as recited in claim 2 wherein the input mode is active in high ambient light and the hold mode is active in low ambient light.

4. The portable electronic device as recited in claim 1 further comprising a manual hold switch that provides a means to physically switch between the input and hold modes.

5. The portable electronic device as recited in claim 4 wherein the hold switch includes three states, a first state that initiates the input mode, a second state that initiates the hold mode, and a third state that initiates the automatic hold feature.

6. A method of operating a portable electronic device, comprising:
monitoring environmental conditions, wherein monitoring includes monitoring an outer surface of the portable electronic device to determine whether a user's hand is contacting the outer surface of the device;
determining whether a triggering event should be initiated based on the environmental conditions; and
changing the portable electronic device from a first mode to a second mode when the triggering event is initiated.

7. The method as recited in claim 6 wherein the step of monitoring further includes monitoring ambient light surrounding the portable electronic device.

8. The method as recited in claim 7 wherein the step of determining includes initiating the triggering event when the ambient light level reaches a certain level or when the ambient light level changes a certain amount.

9. A method of operating a portable electronic device, comprising:
monitoring environmental conditions, wherein the step of monitoring includes monitoring ambient light surrounding the portable electronic device;
determining whether a triggering event should be initiated based on the environmental conditions, wherein the step of determining includes initiating the triggering event when the ambient light level reaches a certain level or when the ambient light level changes a certain amount; and
changing the portable electronic device from a first mode to a second mode when the triggering event is initiated, wherein the step of changing the modes of the portable electronic device includes automatically switching between an input mode where all or a select number of input devices are unlocked and a hold mode where all or a select number of input devices are locked based on the ambient light level.

10. The method as recited in claim 9 wherein the step of switching includes switching to the input mode when ambient light level is high, and switching to the hold mode when ambient light level is low.

11. A method performed on a hand-held media player, comprising:
determining if an auto hold feature is activated;
measuring ambient light surrounding the hand-held media player;
enabling one or more input devices of the hand-held media player when the ambient light level is high and the auto hold feature is activated; and
disabling the one or more input device of the hand-held media player when the ambient light level is low and the auto hold feature is activated.

12. The method as recited in claim 11 further comprising providing a hold switch and wherein the step of determining if the auto hold feature is activated includes monitoring the state of the hold switch.

13. The method as recited in claim 12 wherein the hold switch includes multiple states and wherein at least one state is an auto hold feature state.

14. The method as recited in claim 12 further comprising providing a preference window and wherein the step of determining if the auto hold feature is activated further includes monitoring the state of a automatic hold option of the preference window.

15. The method as recited in claim 11 wherein the one or more input device includes a clickable touch pad and a button disposed at the center of the clickable touch pad.

16. A portable hand held device, comprising:
input devices for making inputs into the portable handheld device;
output devices for outputting information from the portable handheld device;
a plurality of sensors that provides information or cues that help predict the future use of the portable hand held device or anticipate the user's needs associated with the portable handheld device so that the portable hand held device can be configured accordingly, each of the sensors being configured to measure different environmental conditions at the portable handheld device; and
a control system operatively coupled to the input devices, output devices and sensors, the control system including a situational awareness module that obtains sensor data from the sensors and extracts control information from the sensor data, the situational awareness module including a mechanism that maps various functions to sensor events pulled from the sensor data, the functions being implemented when the sensor event or events associated therewith are performed.

17. The portable hand held device as recited in claim 16 wherein the sensors are selected from light sensors, temperature sensors, motion sensors, vibration sensors, orientation sensors, noise sensors, force sensor and touch sensors.

18. The portable hand held device as recited in claim 16 wherein the function is associated with implementing an input/hold mode, and wherein at least two different sensor events are mapped to the input/hold mode function.

19. The portable hand held device as recited in claim 16 wherein at least one of the sensor events is a light event.

20. The portable hand held device as recited in claim 16 wherein the mechanism is a table that is accessed through a control menu that serves as a control panel for reviewing and/or customizing the assigned functionality.

21. The portable electronic device as recited in claim 1 wherein the one or more sensors is selected from temperature sensors, pressure sensors, force sensors and touch sensors.

22. The method as recited in claim 6, wherein monitoring is performed by one or more sensors selected from temperature sensors, pressure sensors, force sensors and touch sensors.

* * * * *

UNITED STATES PATENT AND TRADEMARK OFFICE
CERTIFICATE OF CORRECTION

| | | |
|---|---|---|
| PATENT NO. | : 7,894,177 B2 | Page 1 of 1 |
| APPLICATION NO. | : 11/323378 | |
| DATED | : February 22, 2011 | |
| INVENTOR(S) | : Fletcher R. Rothkopf | |

It is certified that error appears in the above-identified patent and that said Letters Patent is hereby corrected as shown below:

On page 2, in column 2, under "Other Publications", line 35, delete "Protexion" and insert -- Protection --, therefor.

In column 13, line 6, delete "10" and insert -- 110 --, therefor.

In column 13, line 17, delete "10" and insert -- 110 --, therefor.

In column 18, line 44, after "direction" insert -- . --.

Signed and Sealed this
Fifteenth Day of November, 2011

David J. Kappos
*Director of the United States Patent and Trademark Office*